US011869131B2

(12) United States Patent
Kohler et al.

(10) Patent No.: US 11,869,131 B2
(45) Date of Patent: Jan. 9, 2024

(54) PHOTOGRAPHIC METHOD AND SYSTEM FOR AIDING OFFICIALS IN LOCATING AN OBJECT

(71) Applicant: Precision Point Systems, LLC, Shelton, CT (US)

(72) Inventors: Daniel Kohler, Monroe, CT (US); Terence Sauer, Westport, CT (US); David Schroeder, Amston, CT (US); Dennis Wanzie, Shelton, CT (US)

(73) Assignee: PRECISION POINT SYSTEMS, LLC, Shelton, CT (US)

( * ) Notice: Subject to any disclaimer, the term of this patent is extended or adjusted under 35 U.S.C. 154(b) by 0 days.

(21) Appl. No.: 17/898,921

(22) Filed: Aug. 30, 2022

(65) Prior Publication Data

US 2022/0415016 A1 Dec. 29, 2022

Related U.S. Application Data

(63) Continuation of application No. 17/054,321, filed as application No. PCT/US2019/032016 on Sep. 13, 2019, now Pat. No. 11,436,822.

(51) Int. Cl.
G06T 15/00 (2011.01)
G06T 7/536 (2017.01)
G06T 7/73 (2017.01)
G06T 7/136 (2017.01)
G06T 7/149 (2017.01)
G06N 3/08 (2023.01)
(Continued)

(52) U.S. Cl.
CPC ............... *G06T 15/00* (2013.01); *G06N 3/08* (2013.01); *G06T 5/006* (2013.01); *G06T 7/136* (2017.01); *G06T 7/149* (2017.01); *G06T 7/536* (2017.01); *G06T 7/73* (2017.01); *G06V 20/00* (2022.01); *G06T 2207/20081* (2013.01); *G06T 2207/30204* (2013.01); *G06T 2207/30224* (2013.01); *H04W 4/80* (2018.02)

(58) Field of Classification Search
CPC ............................. G06V 20/41; G06V 20/42
See application file for complete search history.

(56) References Cited

U.S. PATENT DOCUMENTS

2003/0063798 A1\* 4/2003 Li .................... H04N 21/44008
707/E17.058
2016/0267663 A1\* 9/2016 Sicking .................... G06T 7/75
(Continued)

*Primary Examiner* — Wen W Huang
(74) *Attorney, Agent, or Firm* — DILWORTH IP, LLC

(57) ABSTRACT

A system and method for determining an absolute position of an object in an area is presented. The system includes a server having a processor, and a plurality of camera nodes coupled to the server. Each node includes a camera that acquires images of the object and area. The server receives image data from a camera, detects the object within an approximate location by image analysis techniques, and determines a relative position of the object in pixel coordinates. The processor then detects stationary markers proximate to the relative location of the object, determines an absolute position of the detected markers relative to known markers to define an absolute position of the marker, and determines an absolute location of the object in relation to the absolute location of the detected marker. This absolute position of the object is provided to an official to accurately locate the object in the area.

20 Claims, 15 Drawing Sheets

(51) Int. Cl.
*G06T 5/00* (2006.01)
*G06V 20/10* (2022.01)
*H04W 4/80* (2018.01)
*G06V 20/00* (2022.01)

(56) References Cited

U.S. PATENT DOCUMENTS

2017/0213087 A1* 7/2017 Chen ..................... G06V 20/42
2018/0099201 A1* 4/2018 Marty ................... A63B 71/06
2021/0241518 A1* 8/2021 Tong ..................... H04N 23/60

* cited by examiner

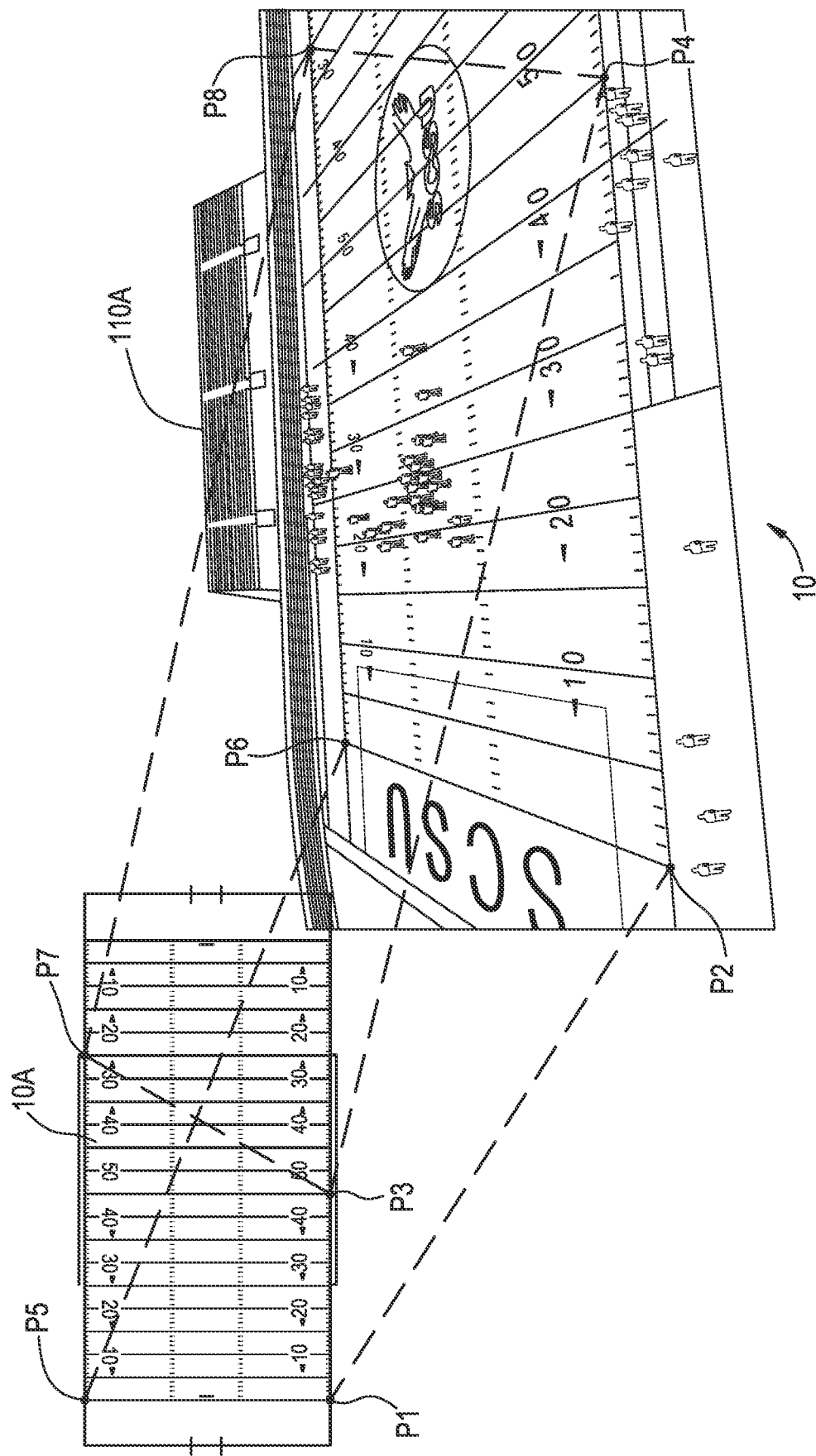

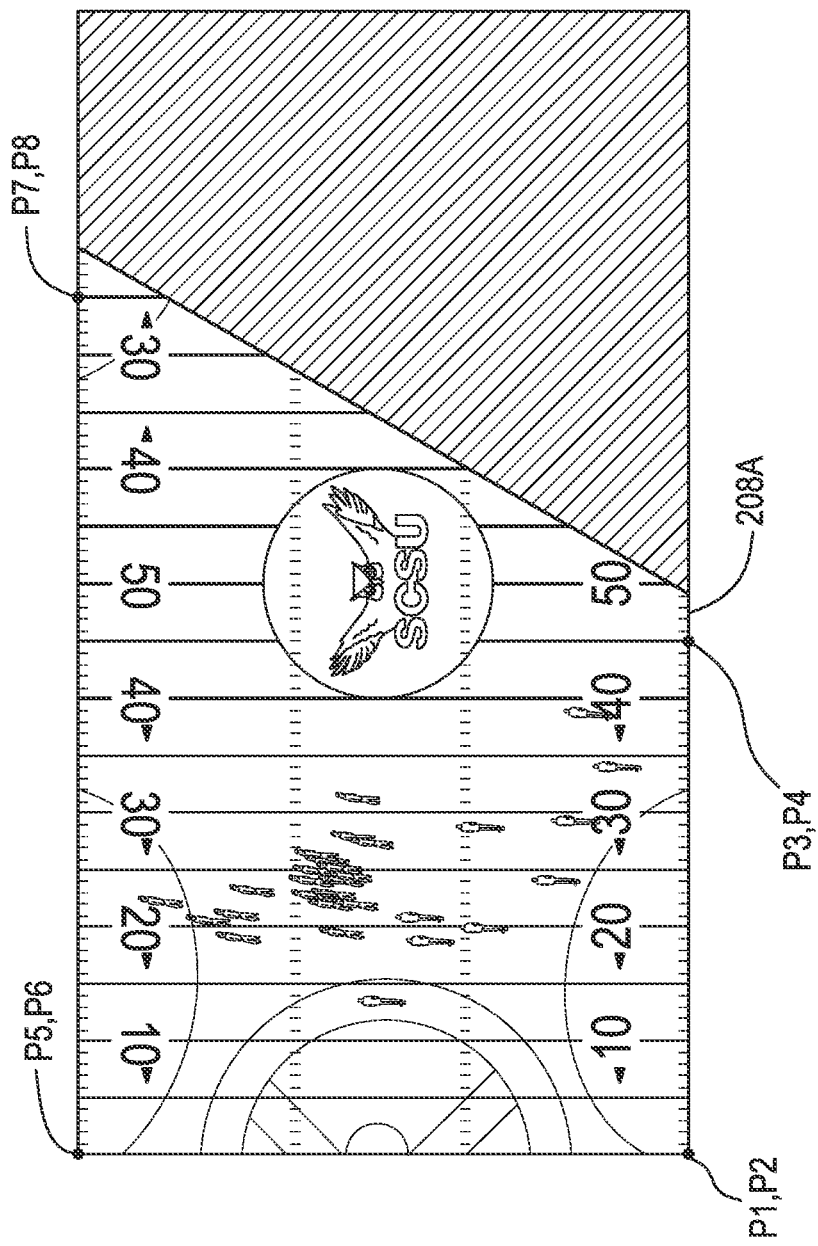

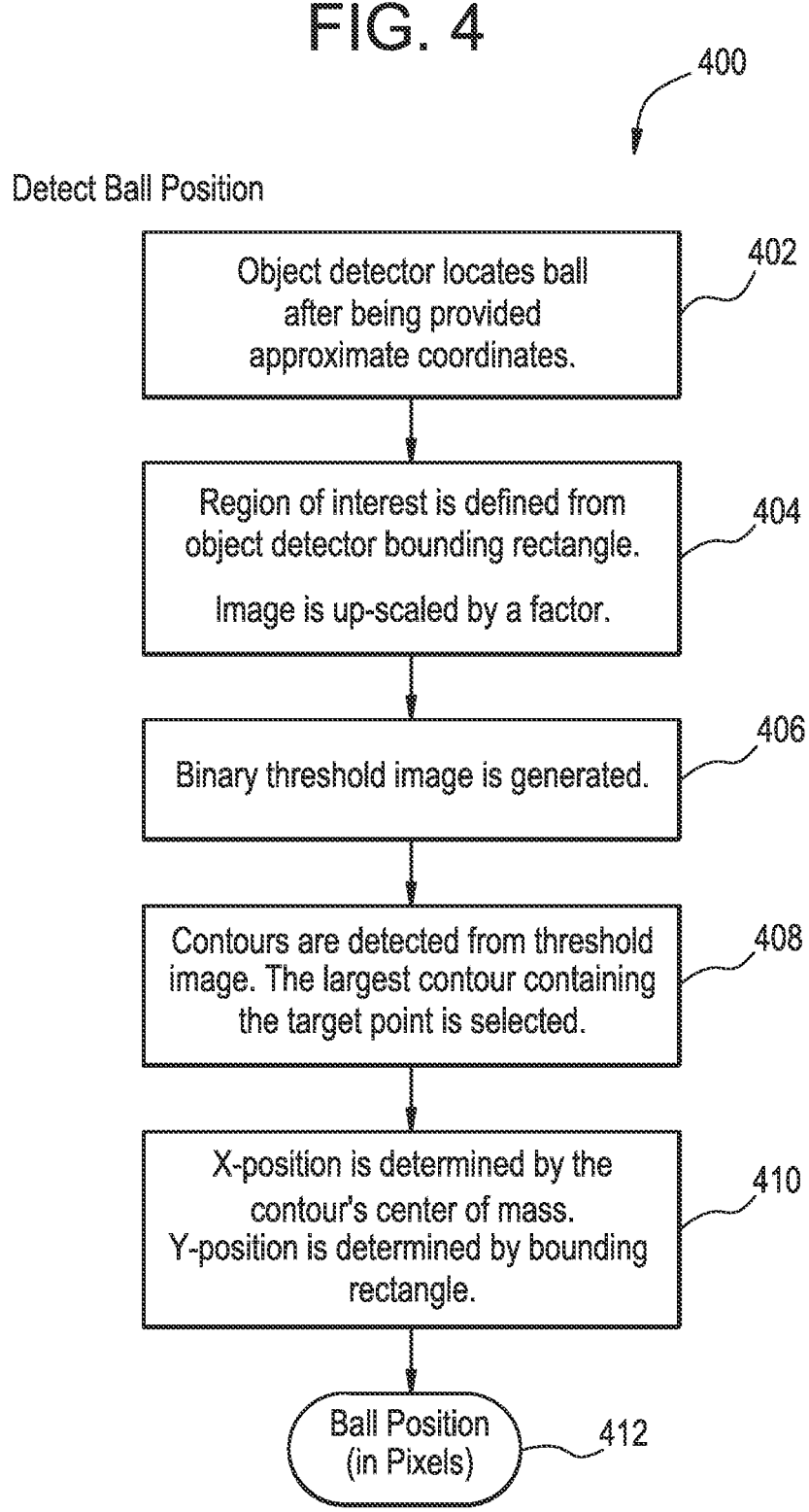

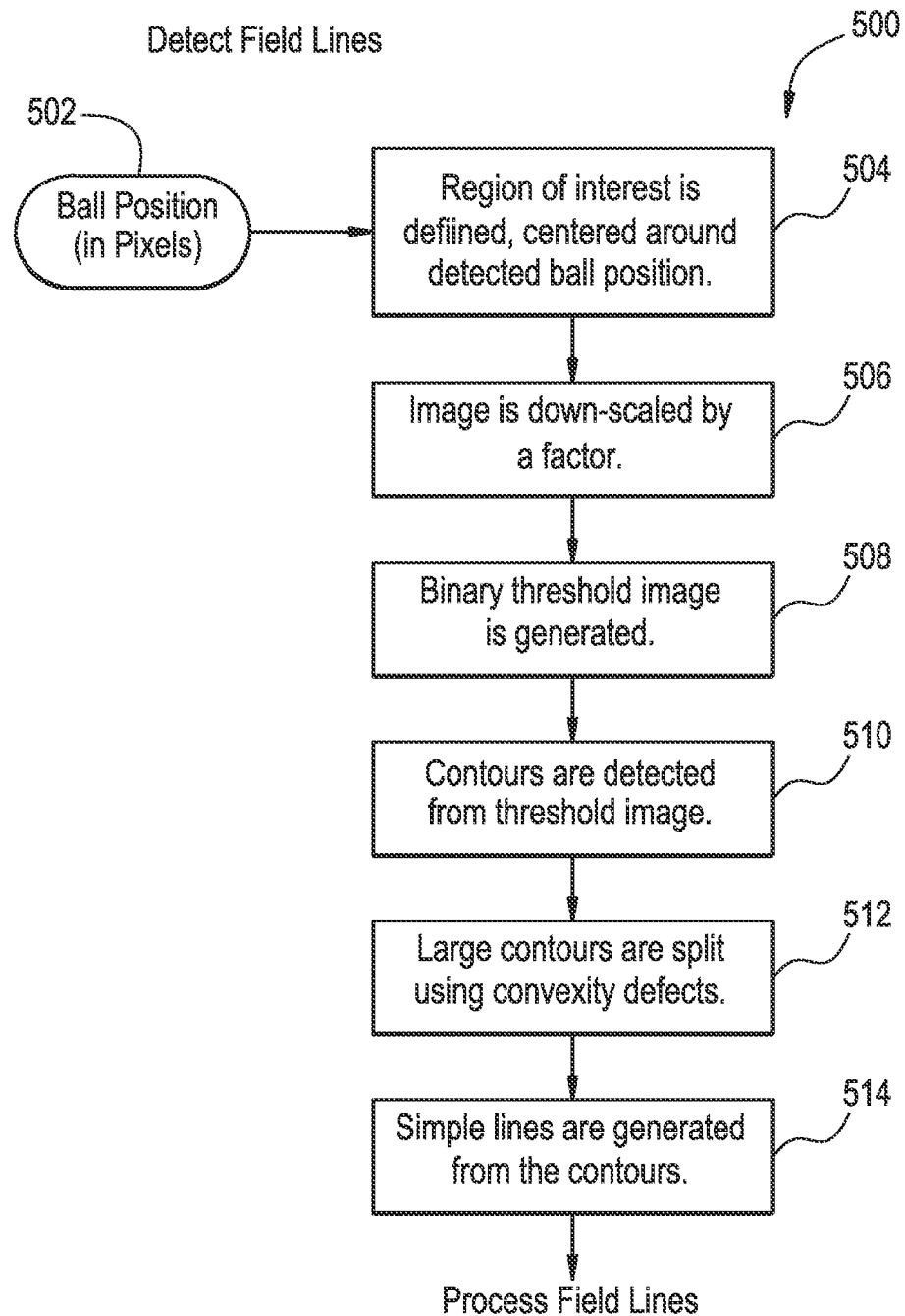

PHOTOGRAPHIC METHOD AND SYSTEM FOR AIDING OFFICIALS IN LOCATING AN OBJECT

CROSS-REFERENCE TO RELATED APPLICATIONS

This patent application is a Continuation of U.S. patent application Ser. No. 17/054,321, filed on Nov. 10, 2020, now U.S. Pat. No. 11,436,822, issued on Sep. 6, 2022, which claims the benefit as a U.S. National Phase application of PCT Application No. PCT/US2019/032016, filed on Sep. 13, 2019. The disclosures of these patent documents are incorporated herein by reference in their entireties.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to an apparatus and a method for determining an absolute position of an object in an area of interest, and using that absolute position to aid officials locate the object. For example, the present invention improves the accuracy and reliability of detecting, tracking, positioning and/or aligning a person and/or an object during a sporting event, including athletic competition, by determining the absolute position of the person and/or object in an area of interest and using that absolute position to aid officials locate the object in the area. More particularly, the present invention is directed to an apparatus and a method for determining an absolute position of a person and/or an object in an area such as, for example, on a field of play, using image analysis techniques.

2. Related Art

In sporting events such as, for example, American football, accurately determining a position of an object, such as a football, on a field is important. The position of the football during play dictates an offensive team's progress in advancing toward their opponent's end zone to score points. When the offensive team advances the football at least ten (10) yards from an initial line of scrimmage within a series of four (4) plays or downs, a new first of the series of four downs is achieved that allows the offensive team to retain possession of the football and control of a next offensive play. Traditionally, the distance to be covered from the initial line of scrimmage to achieve the new first down (e.g., 10 yards) is determined by a pair of markers connected by a chain stretched between the pair of markers. Various mechanical devices have been employed to replace the markers and chain used for measuring the distance to achieve the new first down. Most of these devices, like the traditional markers and chain, suffer from severe shortcomings, including a lack of necessary accuracy, burdensome time required to operate, or reliance on proper alignment of the football with the field. Laser based systems are typically not eye-safe and cause safety concerns for officials and players.

Prior patents for detecting objects and lines on a sport field are generally related to tracking moving objects with the intent of rendering a screen overlay or similar graphic on a video replay of the sporting event. These solutions are typically focused on determining a relative position of the moving object with regards to a video camera's field of view to enhance viewing of a game, and are not concerned with the precision and accuracy of a measurement of a person's or an object's position on the field of play to assist officials more accurately and reliably detect, track, position and/or align one or more persons and/or the ball during play.

For example, U.S. Pat. No. 7,680,301 issued to Pendleton et al. on Mar. 16, 2010, discloses a method used in broadcastings of events for identifying coordinates of an object in world space from a video frame, and adding a graphic to a video replay showing the object once it is identified. Pendleton et al. further disclose the method for identifying a trajectory of the object over time as the object moves through the world space. For example, Pendleton et al. disclose a method for generating a trajectory of a football thrown to a player during a play. An embodiment of the invention is used to identify the relative position of a football during such a broadcast. A processing device may additionally add a graphic showing the location or motion of the object along a trajectory. U.S. Patent Publication No. 2010/0030350 of House et al., published on Feb. 4, 2010, discloses a system and method for analyzing data from athletic events. The disclosure of this U.S. patent document includes methods for determining a location, orientation, or motion of an object (e.g., a ball or a hockey puck) using a sensor system. The sensor system may include one or more cameras. As noted above, these patent documents are merely seen to determining a relative position of an object to enhance viewing of a game, and generally lack the precision and accuracy in measuring a person's or an object's position on the field of play to assist officials more accurately and reliably detect, track, position and/or align one or more persons and/or the object (e.g., ball) during play. Accordingly, the inventors have discovered that accuracy and reliability in detecting, tracking, positioning and/or aligning a person and/or an object during competition can be improved with an apparatus and a method for determining an absolute position of the person and/or the object using image analysis techniques, and that once determined, the absolute position can be provided to officials to improve play.

SUMMARY OF THE INVENTION

Bearing in mind the problems and deficiencies of the prior art, the objects of the present invention include providing a method and system of object location that is flexible in terms of installation requirements, with a high degree of accuracy, and requiring minimal user interaction during normal operation, and may be configured for fully autonomous operation.

In one aspect, the invention includes a method for determining an absolute position of an object in an area of interest. The method comprises steps of receiving image data from at least one camera, the image data including pixels digitizing at least one image of an area of interest within a field of view of the at least one camera. The method also includes generating, for the at least one camera, a correspondence between one or more pairs of points in the field of view of the camera and a representation of the area of interest, the correspondence permitting translation of coordinates from pixels to a unit of measurement of the area of interest. The method includes selecting an approximate location of an object in the at least one image. The method also includes detecting the object of interest within the approximate location by image analysis techniques, defining a region of interest proximate to the detected object of interest, and then, determining a relative position of the detected object of interest in the region of interest, the relative position of the object of interest defined by pixel coordinates.

The method further includes receiving the region of interest and the relative position of the object of interest, and detecting stationary markers within the region of interest and proximate to the relative location of the object of interest. The method then includes determining an offset between at least one of the detected stationary markers and a location of a known marker in the area of interest, and assigning to the detected stationary marker with reference to the offset an indicator representing coordinates in the unit of measurement of the area of interest, the coordinates defining an absolute position of the detected stationary marker in the area of interest. The method then converts the relative position of the object of interest from the pixel coordinates to a location in the area of interest in relation to the absolute location of the detected stationary marker to yield an absolute location of the object of interest in the area of interest. This absolute position of the object of interest is then provided to one or more officials to assist the officials more accurately locate the object in the area of interest.

In another aspect of the invention, a system for determining an absolute position of an object of interest in an area of interest comprises a server having a processor and memory, and a plurality of camera nodes operably coupled to the server. The plurality of camera nodes are each disposed about an area of interest and have a camera that acquires one or more images of an object of interest and the area of interest within the field of view of the camera. Each node also includes an image processor coupled to the camera, the image processor having a transceiver for communication of data between the camera and the server. In one embodiment, a separate image processor is not required, as the camera of each node may directly communicate to send data to and receive data from the server. The processor of the server is configured to determine an absolute position of the object of interest in the area of interest by executing the above described method.

Still other objects and advantages of the invention will in part be obvious and will in part be apparent from the specification.

BRIEF DESCRIPTION OF THE DRAWINGS

The accompanying figures are for illustration purposes only and are not necessarily drawn to scale, and the invention itself, both as to organization and method of operation, may best be understood by reference to the detailed description which follows taken in conjunction with the accompanying figures.

FIGS. 2B and 2C are images illustrating definition of a correspondence between one or more pairs of points in a camera's field of view and a representation of a field of play for at least one of perspective and crown correction, in accordance with one embodiment of the present invention.

FIG. 4 is a flowchart providing more detailed steps of a portion of the process of FIG. 3.

FIG. 6 is a flowchart providing more detailed steps of another portion of the process of FIG. 3.

In these figures like structures are assigned like reference numerals, but may not be referenced in the description of all figures.

DETAILED DESCRIPTION OF THE PREFERRED EMBODIMENTS

Figure 1:
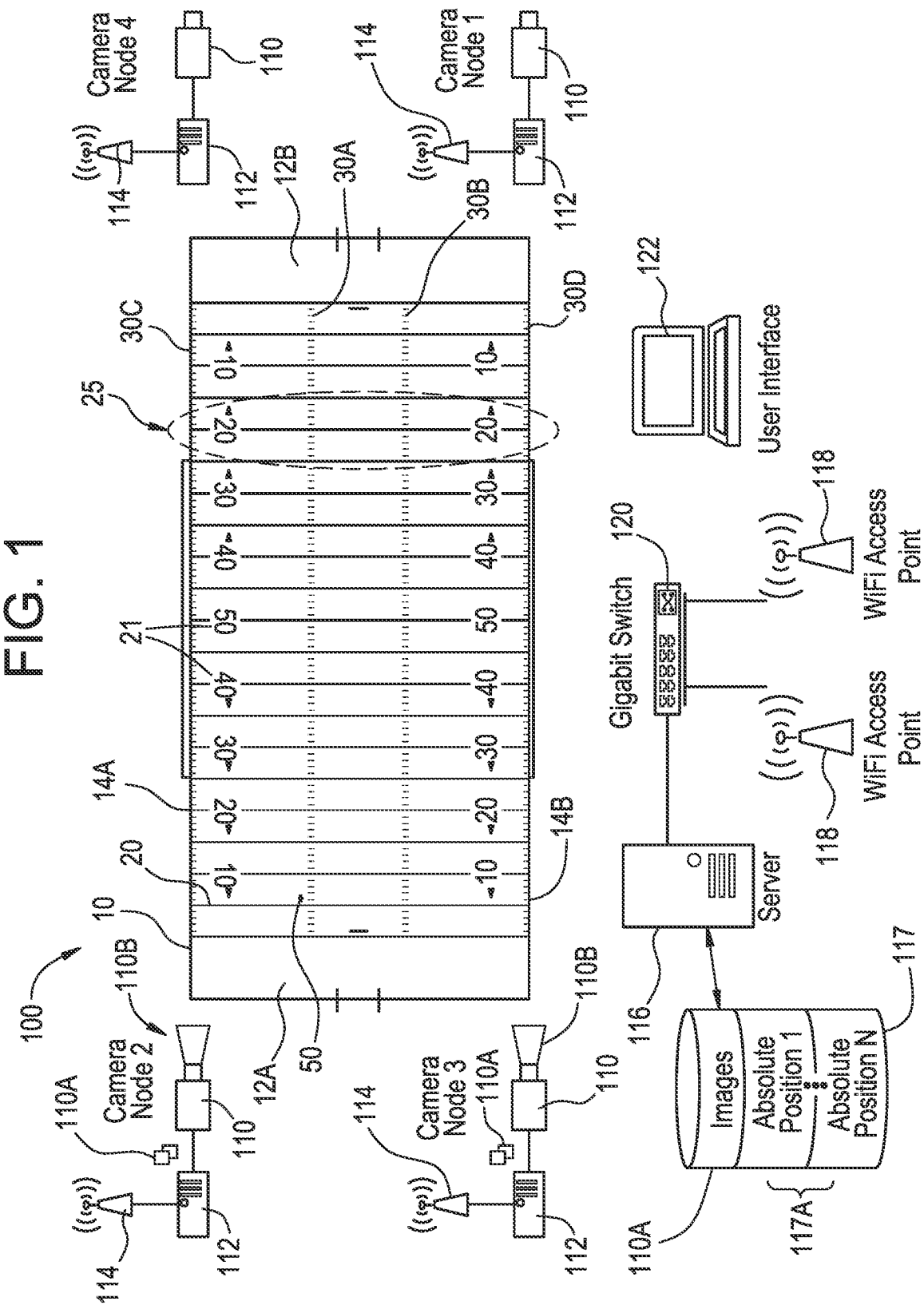
FIG. 1 is an illustration of a system for determining the absolute position of an object on a field of play in accordance with one embodiment of the present invention.

The present invention provides a method and system for determining the absolute position of a person and/or an object on a field of play using image analysis techniques, and using that absolute position to aid officials locate the object in the field. Static images are captured or acquired by one or more cameras and analyzed to locate a person and/or an object of interest, and to determine its absolute position. The relative position of the person and/or the object, in units of camera pixels, with respect to the camera's image is determined with sub-pixel accuracy through a series of image processing techniques. The absolute position of the person or object on the field, in units appropriate to the field such as, for example, in yards, is then determined by referencing predetermined stationary markers in the camera's field of view such as, for example, lines on the playing field. A multi-stage algorithm is used to determine the locations of these markers with sub-pixel accuracy, even when the markers are partially blocked from view by one or more objects. A relationship between the person and/or object and the stationary markers allows a determination of the absolute position of the person and/or object on the field. Once determined, that absolute position is provided to officials to aid the officials locate the object on the field.

A calibration procedure may be used to increase the precision of the system. For example, to improve the accuracy of images captured or acquired by the one or more cameras, techniques are used to minimize, if not substantially remove, lens distortion, and to account for the camera's position/perspective and movement (e.g., rotation and translation) relative to the field of play. In one embodiment, pairs of points are selected at intersections of at least four (4) stationary markers on the field of play, for example, four (4) yard markers in a two-dimensional planar representation of the field and two (2) yard markers on a near sideline of the field in the camera's field of view and two (2) yard markers on a far sideline of the field in the camera's field of view. These point-pairs are used to generate a homography for each camera in the system to account for/correct, for example, each camera's position/perspective relative to the field of play (see, e.g., FIGS. 2B and 2C, described below). Depending on the topography of the field of play, crown correction techniques (e.g., employing polynomials) also utilize the selected point-pairs, typically with additional points selected in the middle of the field (e.g., at hash marks) to account for/correct changes in an elevation of portions of a field such as, for example, a field crown to facilitate drainage of the field. For example, in one embodiment, a polynomial is calculated based on the expected location of the hash marks versus the location of the selected pairs of points. As described below, the perspective correction and, if required, crown correction, techniques permit a mapping of images from the camera space (e.g., in pixels) to playing field coordinates (e.g., x-y coordinates) and vice versa. As described below, in addition to these calibration procedures, a field map function is also generated from field lines detected on the field of play and applied to account for, for example, a camera's position, movement (e.g., rotation and translation) and other factors, relative to the field of play, by using an additional mathematical function (e.g., a least squares or polynomial) derived from the detected position of the field lines to facilitate a determination of the absolute location of the person or object of interest at a specific location on the playing field.

It should be appreciated that while the following discussion refers to determining an absolute position of a football on a football playing field, it is within the scope of the present invention to use the system and methods described herein to locate an absolute position of any object of interest including, for example, a soccer ball, a golf ball, a baseball, a basketball, a hockey puck, a person, an animal, a disc, a javelin, or the like in any field of play or athletic event or competition, to improve the precision and accuracy of a measurement of the object of interest to assist officials to more accurately and reliably detect, track, position and/or align the object and/or to improve a viewer's watching experience. Accordingly, the following discussion of one or more exemplary embodiments does not limit the scope of the present invention.

In one embodiment of the present invention, the method and system for determining an absolute position of an object on a field of play uses image analysis techniques to detect the absolute position of a football on a football field, and once determined, that absolute position is provided to one or more officials to aid the officials in locating the football on the field. The system components include, for example, one or more cameras, one or more data processing units, and a master controller. The cameras are positioned such that the combined field of view of the cameras includes the entire playing field, or a subset of the playing field if there are portions of the playing field where object detection is not necessary. Each data processing unit may receive images from one or more cameras, and perform image analysis to locate and determine the absolute position of the football that is at rest on the playing field, or at a predetermined moment during play.

For example, and as shown in FIG. 1, a football field 10 in the United States typically extends one hundred (100) yards in length between a first end zone 12A and a second end zone 12B, and one hundred sixty (160) feet (53.33 yards) in width between a first side line 14A and a second side line 14B. Each end zone 12A and 12B is ten (10) yards in length. A first set of lines 20, known in the art as yard lines, extends across the width of the field 10, between the first and second side lines 14A and 14B, at approximately five (5) yard increments for the length of the field 10 between the first and second end zones 12A and 12B. At predetermined points, the first set of lines 20 may include indicia 21 identifying a yard line (e.g., 10, 20, 30, and the like) and a direction of play. A second and third set of lines 30A and 30B, known in the art as hash marks, extend partially across the width of the field 10, from points approximately 70 feet, 9 inches from each respective sideline 12A and 12B (for a professional football field; 60 feet for college and high school fields) and extending inwardly for approximately 1 yard in length, at approximately one (1) yard increments between each of the yard lines 20. A fourth and fifth set of lines 30C and 30D, also known as hash marks, extend inwardly from each respective sideline 12A and 12B for approximately 1 yard in length onto the football field 10 at approximately one (1) yard increments between each of the yard lines 20. The yard lines 20 and the hash marks 30A to 30D are collectively referred to hereinafter as field lines 25.

In one embodiment of the present invention, and as shown in FIG. 1, a system 100 for determining the absolute position of a football 50 on the football field 10 includes a plurality of camera nodes, for example, four (4) camera nodes, namely, camera node 1, camera node 2, camera node 3 and camera node 4, are shown. In one embodiment, each camera node includes a camera 110 that acquires or captures one or more images 110A of the football 50 and football field 10 within the camera's field of view 110B, an image processor 112 and a wireless adapter 114 that transmits data (e.g., images 110A, and related information such as, for example, arrays of pixels digitizing the captured images 110A, metadata including data and time stamps for when the images 110A were captured, and the like) to, and receives data from, a server 116 via, for example, one or more wireless adapters or Wi-Fi access points 118 and a switching device 120. In one embodiment, the server 116 includes or is operably coupled to a data store 117 that stores the images 110A received from the camera nodes, and a plurality of determined absolute positions 117A (e.g., absolute position 1 to absolute position N) of the object of interest in the area of interest (e.g., the football on the field 10). The server 116, and in turn each of the camera nodes 1 to 4, are controllable via a user interface 122. While the plurality of camera nodes are illustrated and described as including four camera nodes 1 to 4, the present invention is not limited in this regard as more than four or less than four camera nodes can be employed without departing from the broader aspects of the present invention. It should be appreciated that additional camera nodes provide increased visibility of the football field 10 despite obstacles such as players on the field, and also higher resolution as each camera is employed to cover a smaller region of the football field 10. Additionally, while each camera node is described above as including an image processor 112 coupled to the camera 110, in one embodiment, a separate image processor is not required, as the camera 110 of each node may directly communicate to send data to and receive data from the server 116.

In one embodiment, suitable cameras include Canon Model 5Ds, Nikon Model D810, Pentax Model K01 and Sony Model Alpha 99 II were used. It should be appreciated that while described herein, the present invention is not limited to a preferred or exemplary camera, sensor, lens or other camera features or functions. In one embodiment, the camera nodes are equipped with dedicated high-speed interfaces such as gigabit Ethernet to transfer images and data faster and efficiently. In one embodiment, industrial cameras typically used for machine vision or inspection are employed to better tolerate conditions of temperature and moisture. In one embodiment, a suitable industrial camera includes the SVS-Vistek EXO183CGETR equipped with a Sony Exmor R IMX183 sensor, and a 20 MPix, Micro-Four-Thirds lens interface. In one embodiment, a suitable industrial camera includes the SVS-Vistek evo12040CBGEB, or the Basler acA5472-5gc.

Figure 2A:
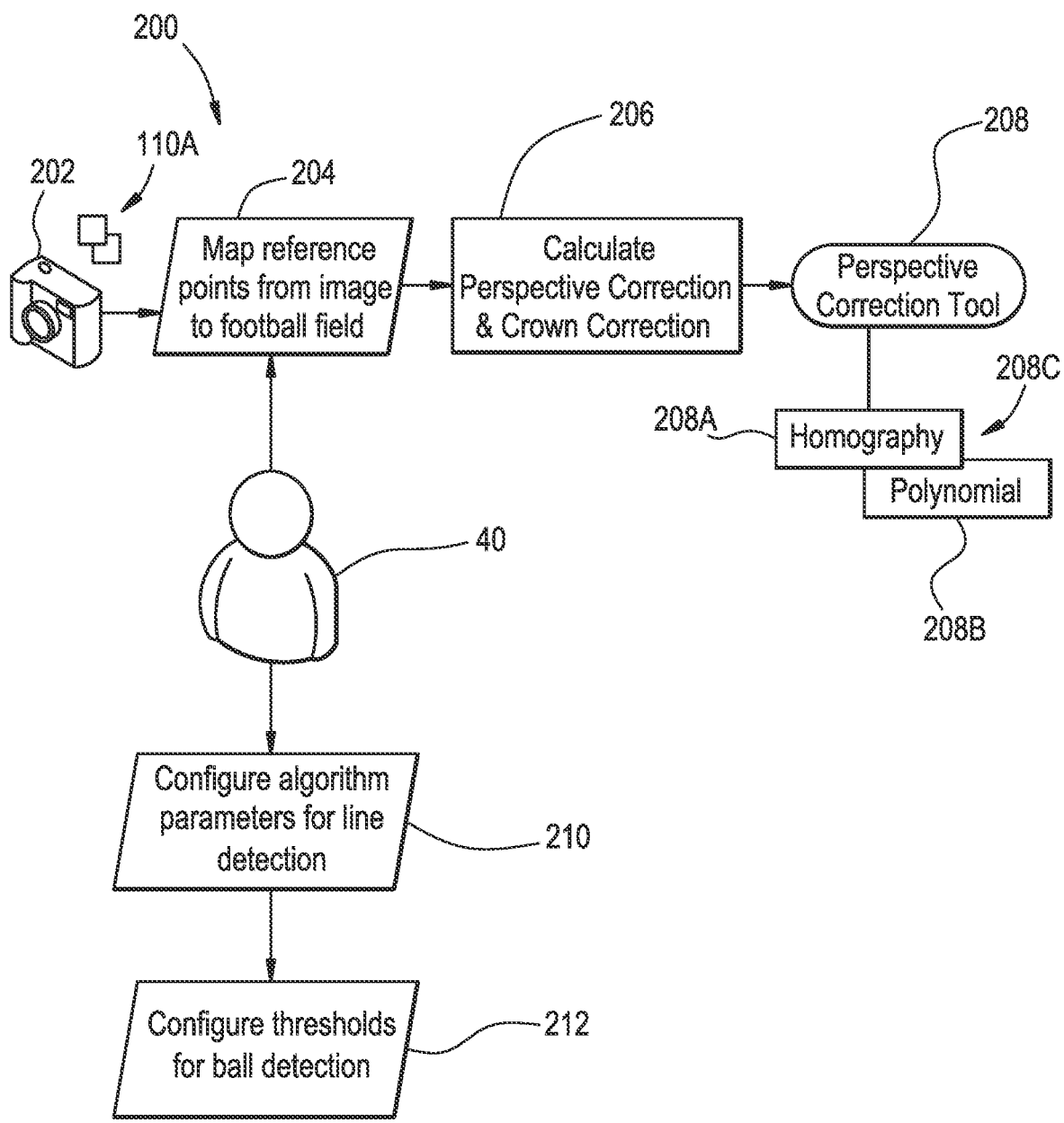
FIG. 2A is a flowchart of one embodiment of a calibration process for the system of FIG. 1.

As described above, the system 100 may require calibration to compensate for various factors such as camera mounting locations, camera movement and angles, playing field dimensions, environmental conditions surrounding the field of play, and like factors that can influence image perspective. Calibration may be a one-time process at, for example, initial set-up and configuration of the system 100, or may occur periodically during use of the system 100. As shown in FIG. 2A, one embodiment of a calibration process 200 of the system 100 includes step 202 in which the series of images 110A of the field 10 are generated or captured and processed by the camera nodes 1 to 4. In steps 204 to 208, a two-dimensional or a three-dimensional homography is defined and refined for each camera node 1 to 4 thereby mapping camera pixels to coordinates of playing field 10, and vice versa. In one embodiment, illustrated in FIGS. 2B and 2C, a two-dimensional homography 208A is defined by selecting four (4) or more pairs of points, with one point in each pair representing a position on stationary marker on the field 10, e.g., a yard marker, in a two-dimensional planar representation 10A of the field 10 (e.g., points P1, P3, P5 and P7 of the planar representation 10A of FIG. 2B) and a second point representing a pixel coordinate of the stationary marker in the camera's field of view as represented in images 110A from the camera 110 (e.g., points P2, P4, P6 and P8 of the image 110A of FIG. 2B), resulting in pairings of point P2 with P1, point P4 with P3, point P6 with P5, and point P8 with P7, as shown in of FIG. 2B. A homography for each of the camera nodes is generated representing a transformation of the images acquired by the camera nodes 1 to 4 of the football field 10 into a 3-x-3 matrix. Depending on the topography of the playing field 10, for instance a football field with a crown at a centerline along its length to facilitate drainage toward the sidelines, crown correction is performed in which select pairs of points on the football field 10, such as, for example, the top of each opposing hash mark 30A and 30B, and a polynomial is calculated to compensate for any non-linearities in the homography caused by the crown of the football field 10. In step 206, calculations are performed to determine if corrections to the homography 208A are necessary to compensate for perspective and crown deviations. If necessary, in step 208, adjustments are made to compensate for perspective and crown deviations. In one embodiment, as described below, software code is generated as a correction tool 208C that contains the homography 208A for perspective correction and, optionally, the polynomial 208B for crown correction. The correction tool 208C is used for translating camera coordinates (in pixels) to field coordinates (in yards) and vice versa. Thereafter, a user 40 configures algorithm parameters for line detection in step 210, and thresholds for detection of the football in step 212, via, for example, the user interface 122.

In one embodiment of perspective correction, the homography 208A is calculated using sets of points from images collected by the camera nodes 1 to 4 and mapping the points to a coordinate system applied to the football field 10 (e.g., as illustrated in FIGS. 2B and 2C). For example and as noted above, in one embodiment, the homography calculation uses points from images collected by the camera nodes 1 to 4 intersecting with the sidelines 14A and 14B.

Figure 3:
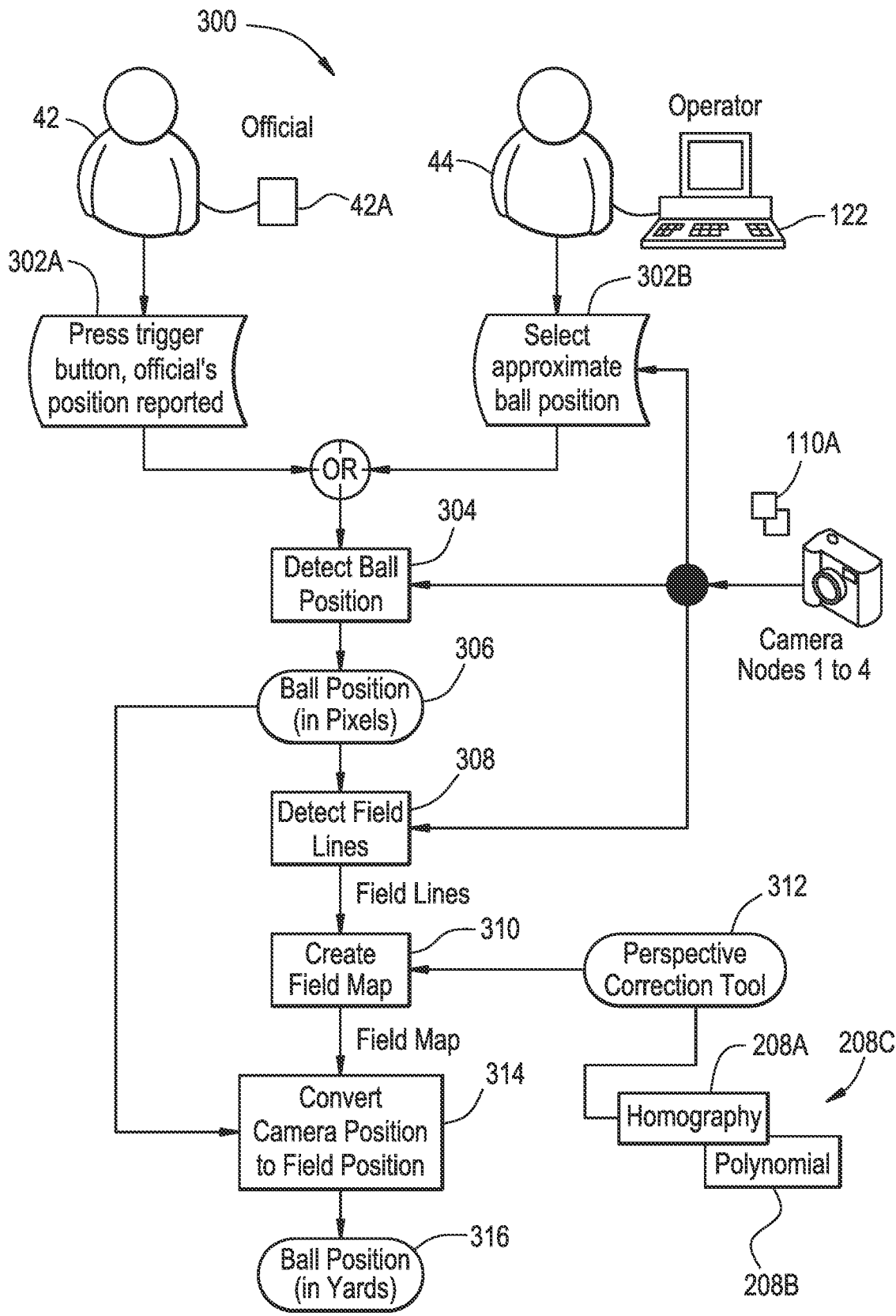
FIG. 3 is a flowchart of one embodiment of a process for detecting a relative position of an object of interest and its absolute position on a field of play using the system of FIG. 1.

One embodiment of a process 300 of the system 100 for detecting a relative and absolute location of an object of interest is shown in FIG. 3. Typically, the size of the object of interest is relatively small in comparison to a camera's total field of view. For example, the size of the football 50 is relatively small in comparison to the football field 10. In professional American football, for example, the length of a football is about eleven inches (11 ins.) from tip to tip, and the diameter at the ball's center is about eight and twenty-one thirty seconds of an inch (8.65 in.). Non-professional American footballs are slightly smaller. To more easily locate the object of interest, namely the football 50, the approximate coordinates of the football 50 on the playing field 10 can be input into the system 100. This can be accomplished through a variety of methods such as by reporting an approximate field position to the system or by manually selecting a pixel coordinate on an image 110A from a camera 110. For example, in step 302A, a referee or official 42 in possession of a wireless device 42A transmits a signal to the server 116 thereby providing a position or approximate coordinate of the position of the football 50 on the playing field 10. In one embodiment, the official wears the wireless device 42A comprised of, for example, a mobile telephone or watch and presses a trigger button on the device 42A to report (e.g., communicate by an RF signal, wireless transmission, or the like) the approximate coordinates of the position of the football 50 on the playing field 10. In one embodiment, the location of the official may be identified using a GPS location of the official on the field. In still another embodiment, an RFID tag may be included on or in the football 50, and a signal therefrom detected to indicate the approximate coordinates of the football 50. As an alternative to the official activating a reporting signal, in step 302B, a user or an operator 44 selects an image 110A that includes the approximate coordinate of the position of the football 50 and transmits the approximate coordinate to the system 110 via, for example, the user interface 122. In one embodiment, a neural network can be trained to locate an approximate position of the football 50 on the football field 10, which approximate location is within ten to fifteen (10 to 15) feet of the football 50. In step 304, the relative position of the football 50 is detected, and in step 306, the position of the football 50 in units of camera pixels is determined. It should be appreciated that in step 302B in which the operator selects an image 110A, and in step 304 in which the relative position of the football 50 is detected, the respective images 110A are selected from the images 110A generated or captured and processed by the camera nodes 1 to 4. The approximate coordinates (e.g., x-y coordinates) of the football 50 is specified in terms of a pixel coordinate relative to one of the camera nodes 1 to 4, and the coordinates of the football 50 are mapped to coordinates of the playing field 10 using the previously calculated homography for each of the camera nodes.

In steps 308 and 310, stationary markers, e.g., the field lines 25, are detected and a field map is created or generated to determine the absolute position of the object of interest, e.g., the football 50, on the playing field 10. Again, it should be appreciated that in step 308 in which a field map is created or generated, respective images 110A are selected from the images 110A generated or captured and processed by the camera nodes 1 to 4. Optionally, in step 312, adjustments to the field map are made to compensate for perspective and crown deviations, with use of the correction tool 208C. In step 314, the position of the football 50 in pixels, or the camera position of the football 50, is determined relative to a position on the field 10. In step 316, the position of the football 50 in yards or relative to the field lines 25 is determined. That is, once the homography is applied for perspective correction, with or without crown correction, to convert camera pixels to coordinates (e.g., x-y coordinates) of a position on the field 10, an interpolation function derived from the detected field lines is applied to determine the absolute position of the football 50 on the field 10 with sub-pixel accuracy. In one embodiment, the interpolation function is, for example, a least squares regression or a polynomial regression.

Detection of Relative Position

Details of a process 400 for detecting the relative position of the object of interest (e.g., a football 50) in pixels (e.g., steps 304 and 306 in FIG. 3) are provided in FIGS. 4 and 5A to 5E. Once the relative playing field coordinate of the object of interest has been established, the relative pixel position of the object is determined using the homography for each camera node 1 to 4 in the system 100. The object of interest is determined to be in at least one of the camera's field of view 110B if the mapped pixel coordinate is within the bounds of the camera's image size ($0 \le x <$width AND $0 \le y <$height). Further processing to locate the relative position of the object is only performed on images 110A from the camera nodes 1 to 4 that contain the object of interest within their field of view 110B. As can be appreciated, at times, the object of interest is not within the field of view 110B of every camera 110.

Figure 5A:
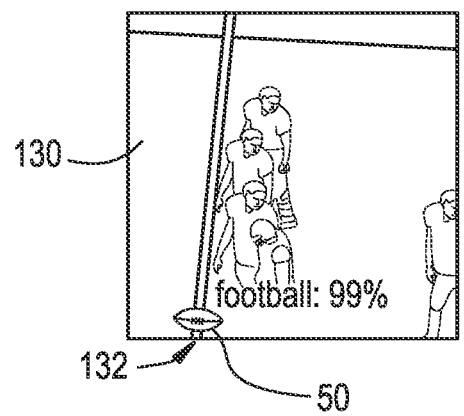
FIG. 5A is a resultant image of one of the process steps of FIG. 4.
Figure 5B:
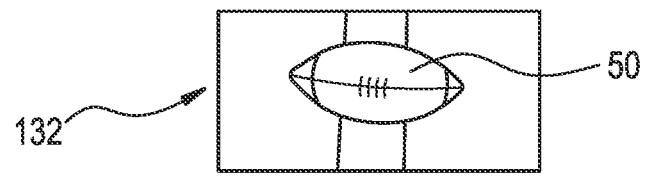
FIG. 5B is a resultant image of one of the process steps of FIG. 4.

In step 402, an object detector (e.g., the neural network described above) locates a relative position of the object of interest (e.g., the football 50) after being provided with the approximate coordinates (e.g., at steps 302A or 302B in FIG. 3). As shown in FIGS. 5A and 5B, a cropped version 130 of each image 110A is generated, centered on the approximate pixel coordinate of the football 50. The cropped image is passed to the object detector that has been pretrained to recognize the object of interest such as, for example, the football 50. If the object detector finds the football 50, a bounding rectangle 132 containing the football 50 is generated. In step 404, a region of interest 134 is defined by the bounding rectangle 132 and scaled up for future processing. The region of interest 134 is a significantly reduced image in relation to the cropped version of the images generated by the object detector and centered on the approximate pixel coordinate. The region of interest 134 provides for more efficient future processing steps and reduced computation time. In some embodiments, other permutations are employed to acquire an image containing the football 50, such as for example, manually indicating the center of the football 50, or utilizing object segmentation techniques to identify the specific pixels making up the football 50.

In one embodiment of the steps 402 and 404 wherein the steps 402 and 404 are performed by an algorithm, steps 402 and 404 include receiving the approximate coordinates of the football 50 and calculating a length of the football 50 in pixels using the field map (homography) based on a target relative position of the football 50. The source image 110A is cropped and the region of interest 134 is calculated. An image scale is selectively adopted and specified. Alternatively, when using a template matching technique, the image scale is calculated from the size of the football 50 and the size of the template. The image is resized (up-sampled) according to the selected image scale using a pixel interpolation method defined in the algorithm parameters, to increase precision.

Figure 5C:
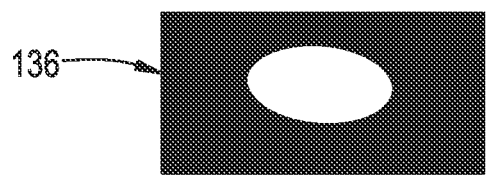
FIG. 5C is a resultant image of one of the process steps of FIG. 4.
Figure 5D:
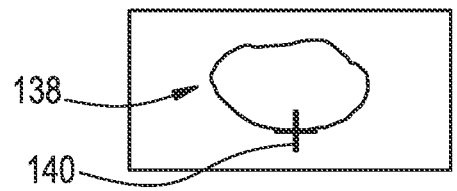
FIG. 5D is a resultant image of one of the process steps of FIG. 4.
Figure 5E:
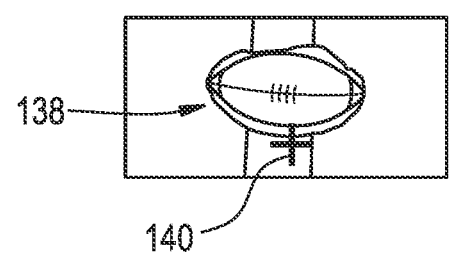
FIG. 5E is a resultant image of one of the process steps of FIG. 4.

In step 406 of the process 400 and as shown in FIG. 5C, a threshold image 136 is generated. In step 408 and as shown in FIGS. 5D and 5E, contours 138 are detected from the threshold image 136 and are used to identify the object of interest 50 within the threshold image 136. A target point 140 located at a selectable pixel position such as, for example, the bottom center of the football 50, is then determined with sub-pixel accuracy.

In one embodiment of the step 406 wherein the step 406 is performed by an algorithm, a customizable thresholding method is selected and a set of customizable parameters are established for applying the thresholding method to the image. Such customizable thresholding methods include, for example, a mathematical coordinate transformation or color equalization from an associated red-green-blue color space (i.e., YCC, YCbCr, Y'CbCr, Y Pb/Cb Pr/Cr, $YC_BC_R$ or $Y'C_BC_R$), hue selection, neural network-based thresholding, and the like. Such customizable thresholding parameters include, for example, establishing a threshold limit value and/or a gaussian smoothing factor. For the hue selection thresholding method, other customizable thresholding parameters include, for example, establishing a hue shift and/or a white filter threshold. Holes in the threshold image are filled using a morphological transform "close" technique (dilation followed by erosion).

In step 410, the relative position of the football 50 is located using the contours 138 of the threshold image 136 or template matching. In one embodiment of step 410, an X-position is determined by a center of mass of the contour 138, and a Y-position is determined by the bounding rectangle 132. In step 412, the relative position of the football 50 in pixels is established. For example, the relative position of the football 50 in pixels is established using a known length and diameter of the football 50 in pixels and the center of mass or the target point 140 at the selected pixel position (e.g., the bottom center of the football 50). In one embodiment, the same image, such as for example the region of interest 134, is processed multiple times, or iteratively processed, with slightly different center points and then the results are averaged.

In another embodiment of steps 410 and 412 wherein the steps 410 and 412 are performed by an algorithm, a template image of the football 50 is created with a customizable border set around the football 50. A customizable border width is established and the border creates negative space around the football 50 that affects a template matching score. A template matching method is selected and a template matching threshold is established. The template matching threshold sets a minimum score to qualify as a match such that a relative position of the football 50 is set if its score is greater than the template matching threshold. The ball size (width and height) is calculated using the field map (homography).

By setting the ball size and the scaling factor, an elliptical area of interest in the shape of the football, where it is expected to be positioned, is calculated. The contours 138 appearing completely inside the elliptical area of interest are selected and a single contour profile or ellipse in the shape of the football is created. The relative position of the football 50 is determined by selecting a desired pixel position, such as for example, the bottom center of the ellipse. Alternatively, the moments of the ellipse are used to determine its center, and a bounding box provides the bottom coordinate as the position of the football 50. The detected object is verified as being a football by rotating a rectangle about the ellipse, ensuring that the width, height, and angle match a set of specified expectations, and ensuring that the area of the ellipse is within a specified range. In step 412, the relative position of the football 50 in pixels is established.

Detection of Absolute Position

If the position and angle of the camera nodes 1 to 4 were absolute, the pixel position of the object of interest could be mapped to an absolute position on a playing field using the homography for the camera nodes 1 to 4. However, due to variabilities in the position and angle of the cameras 110 caused by outside forces such as, for example, wind, vibrations, thermal expansion and contraction, and the like, the resulting position of the object of interest is a relative position on the playing field 10 and not an absolute position on the playing field 10. The homography mapping is also a determination of relative position on the playing field 10 (from the camera's pixel space to x-y field coordinates) that does not provide accuracy across the entire playing field. Accordingly, and in accordance with embodiments of the present invention, one or more positions of predetermined stationary markers located on the playing field 10 are detected and established as references for the absolute positioning of the detected object on the playing field 10. In one embodiment, the predetermined stationary markers located on the playing field are the field lines 25 of the football field 10. After the field lines 25 are detected, the field lines 25 are processed to establish the absolute position of the football 50 on the football field 10 with respect to one or more of the field lines 25 proximate to the football 50.

In one embodiment, a line precision interpolation function is derived from the field lines 25 for converting positions of the field lines 25 (and other objects of interest) generated in camera pixels to positions on the football field 10, with improved accuracy and reference to the field lines 25. In one embodiment, the homography is applied for perspective correction, crown correction is applied as needed, and line precision is applied. In one embodiment, the homography 208A and the polynomial 208B for crown correction are integrated into the correction tool 208C.

Figure 8A:
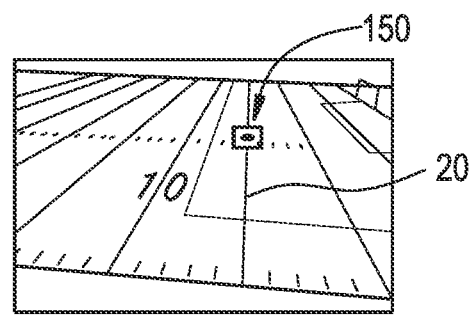
FIG. 8A is a resultant image of one of the process steps of FIG. 6.
Figure 8B:
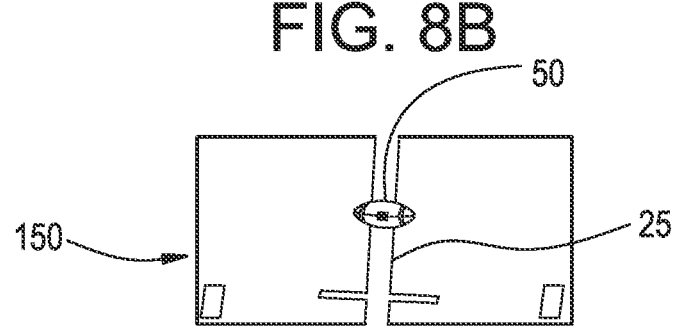
FIG. 8B is a resultant image of one of the process steps of FIG. 6.
Figure 8C:
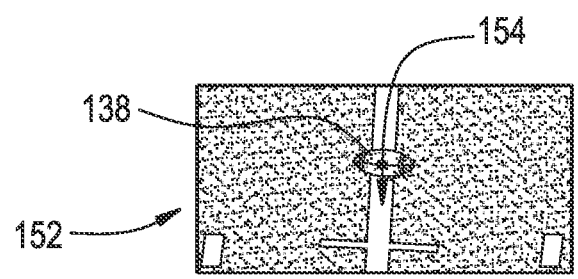
FIG. 8C is a resultant image of one of the process steps of FIG. 6.
Figure 8D:
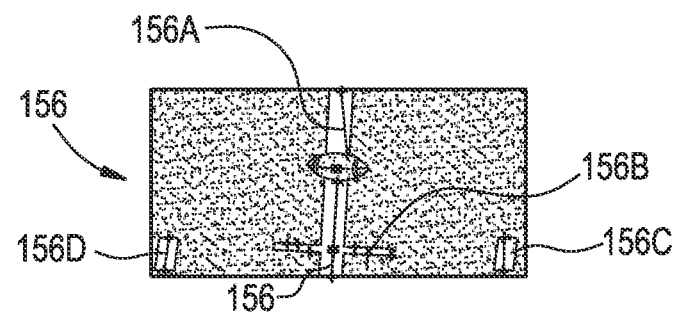
FIG. 8D is a resultant image of one of the process steps of FIG. 6.

Details of a process 500 for detecting field lines 25 (e.g., step 308 in FIG. 3) are provided in FIGS. 6 and 8A to 8D. As described above, in step 412 of the process 400, the relative position of the football 50 in pixels is established. In step 502, the relative position of the football 50 in pixels is received. In step 504, a region of interest 150 is defined centered around the relative position of the football 50 (FIG. 8A). In step 506, the region of interest 150 is scaled down by a selected factor and includes the football 50 and at least one selected field line 25 proximate to the football 50 (FIG. 8B). In step 508 a threshold image 152 is generated (FIG. 8C). In step 510, contours 154 along the selected field line 25 are detected from the threshold image 152. In step 512, large contours 154 outlining the selected field line 25 are split using convexity defects. In step 514, simple lines, shown generally at 156 in FIG. 8D, are generated along the selected field line 25 from the contours of the object 138 and the large contours 154 of the selected field line 25. For example, simple lines 156A and 156B are generated within portions of a yard line 20 broken by the contour 138 formed about the football 50 (FIGS. 5B to 5E, and 8B to 8D), and simple lines 156C and 156D are generated within the hash marks 30A and 30B from the large contours 154 formed about the selected field lines 25.

In one embodiment of process 500, the steps 504 to 514 are performed by an algorithm. In step 504, region of interest 150 is calculated with reference to specified width and height parameters. In step 506, the image is resized according to a specified scale and using a pixel interpolation method such as, for example, cubic interpolation. In step 508, a customizable thresholding method is selected and a set of customizable parameters are established for applying the thresholding method to the image. Such customizable thresholding methods include, for example, adaptive thresholding, HSV (Hue, Saturation, and Value) thresholding, and the like. Such customizable thresholding parameters include, for example, establishing a threshold block size and/or a threshold offset. Holes in the threshold image are filled using a morphological transform "close" technique (dilation followed by erosion). In steps 510 and 510, the large contours 154 are detected from the threshold image 152 using specified parameters, such as for example, contour maximum iterations, contour split minimum height, and contour split minimum width. The inventors have discovered that using the iterative approach to analyze the threshold image 152 enabled the identification of the large contours 154 (i.e., contours having a height and width both greater than the specified parameters), and the identification of convexity defects of the large contours 154 that are subsequently used in step 512 to split the large contours 154.

As a result of using the iterative approach to split the large contours 154, a set of field lines 25 are generated from the contours 154. A bounding rectangle is generated around the generated set of field lines 25. An edge point having X and Y coordinates is identified where any one of the generated field lines 25 lies on an edge of the bounding rectangle and the edge points are ordered first by a respective X coordinate or position and then by a respective Y coordinate or position. In step 514, the simple lines 156 are generated by connecting a top median point and a bottom median point.

Details of a process 600 for processing the detected field lines 25 (e.g., step 310 in FIG. 3) are provided in FIGS. 7A, 7B and 8E to 8G. As described above, in step 514 of the process 500, simple lines 156 are generated along the selected field line 25 from the contours 138 and 154 (FIGS.

8C and 8D). In steps 602 and 604 of the process 600, the correction tool 208C, employing the homography 208A for perspective correction and optionally polynomial 208B for crown correction, is applied to the simple lines 156 to generate refined or corrected version of each of the simple lines 156, and to convert the simple lines 156 from camera/pixel coordinates to field coordinates. The refined or corrected version of each of the simple lines 156 are referred to hereinafter as corrected lines. In steps 606 to 610, each of the corrected lines is analyzed to determine its suitability for continued processing in accordance with the process 600. The suitability of a corrected line for continued processing is selectively customizable by setting related parameters. For example, in step 606, corrected lines having angles outside the range of about 85° to 95° are discarded; in step 608, corrected lines shorter than a pre-join minimum length (percentage of total field width) are discarded; and in step 610, corrected lines with midpoints farther than one-half yard from an expected yard line 20 are discarded. It should be appreciated that one or more of these correction parameters is selectively definable. In step 612, a yardage offset 612A (used in further processing described below) is calculated as a median distance from a known yard line 20. In step 614, hash marks 30A to 30D depicted in the region of interest 150 are detected. In step 616, lines that are outside of play or off of the football field 10 are discarded.

Figure 7A:
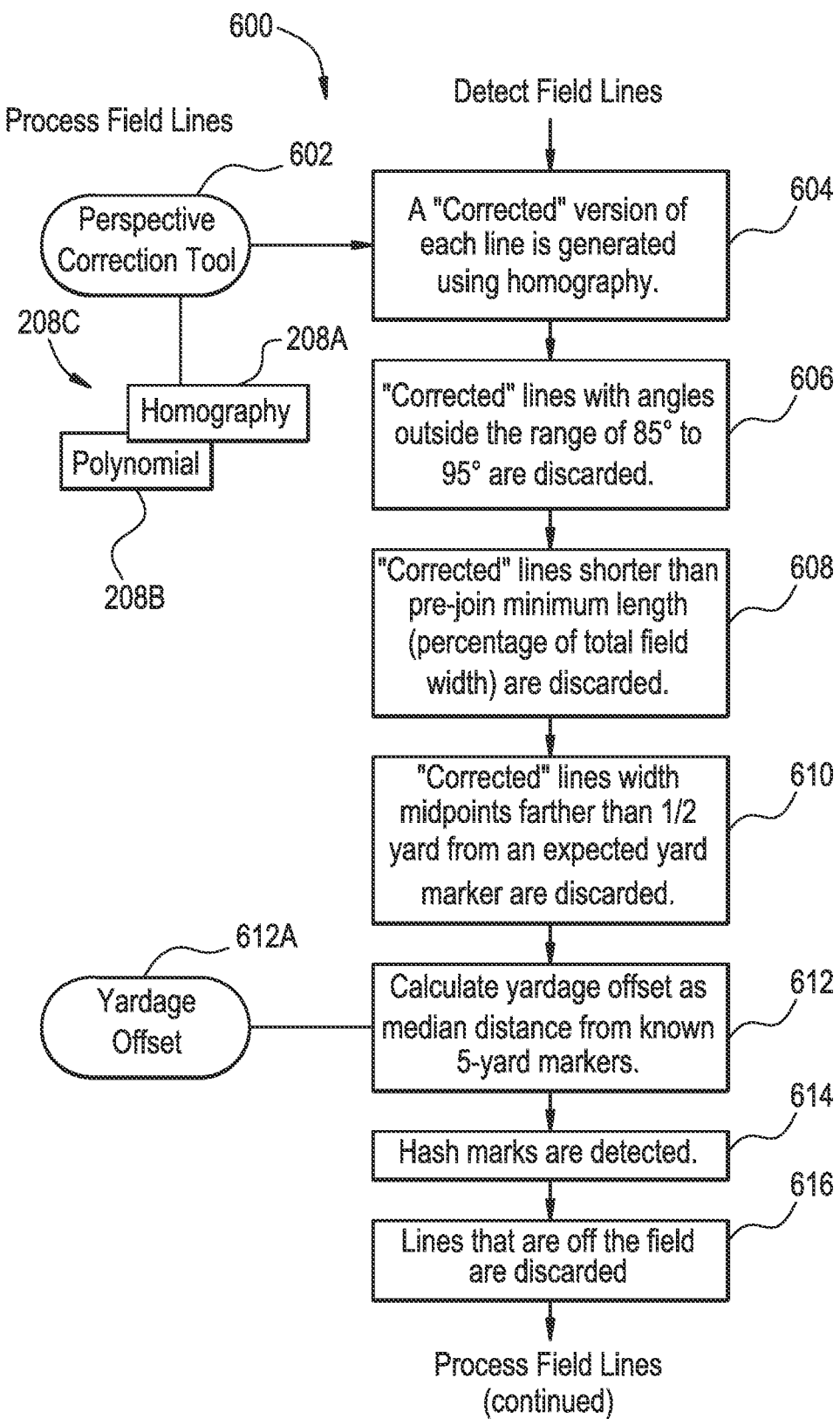
FIG. 7A is a flowchart providing more detailed steps of yet another portion of the process of FIG. 3.
Figure 7B:
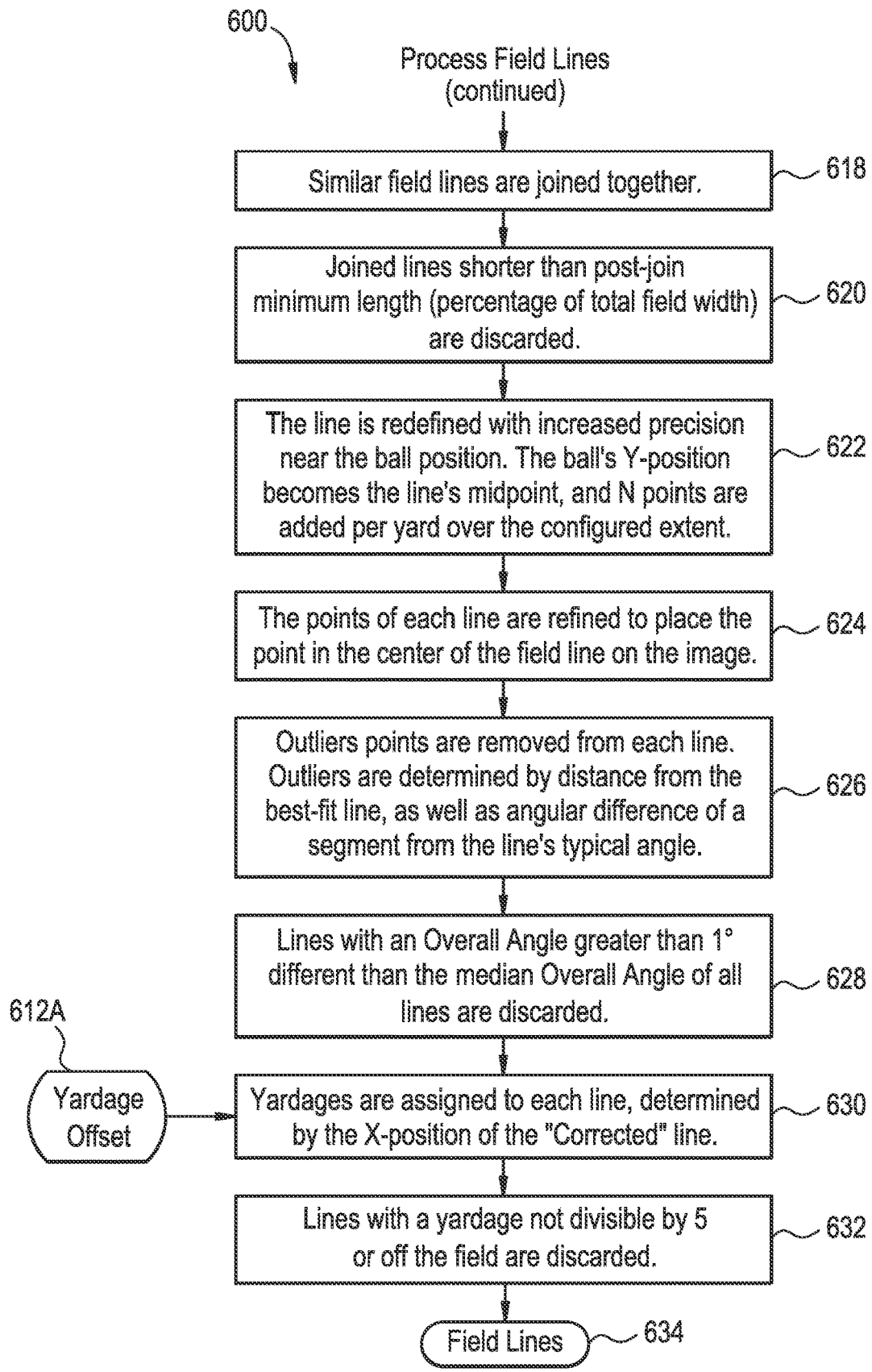
FIG. 7B is a continuation of the flowchart of FIG. 7A.
Figure 8E:
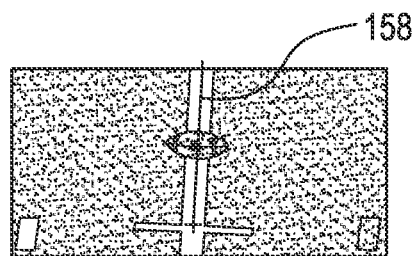
FIG. 8E is a resultant image of one of the process steps of FIG. 7B.
Figure 8F:
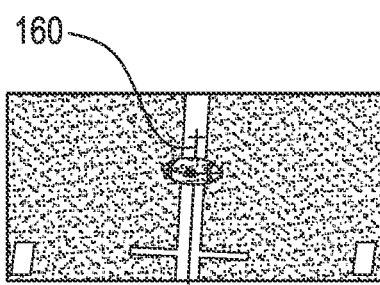
FIG. 8F is a resultant image of one of the process steps of FIG. 7B.
Figure 8G:
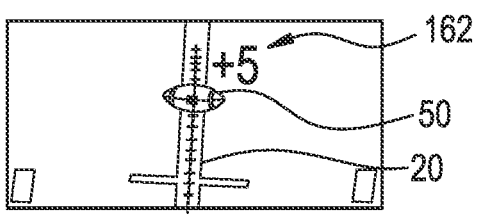
FIG. 8G is a resultant image of one of the process steps of FIG. 7B.

Continuing with the process 600 as shown in FIG. 7B, in step 618, similar simple lines 156 and/or corrected lines are joined together into joined lines 158. For example, as shown in FIGS. 8D and 8E, simple lines 156A and 156B of a yard line 20 are joined as a joined line 158. The suitability of a joined line 158 for continued processing is also selectively customizable by setting related parameters. For example, in step 620, joined lines 158 shorter than a post-join minimum length (e.g., a percentage of total field width) are discarded. In step 622, the joined lines 158 are established with increased precision as redefined lines 160 near the detected relative position of the football 50 (FIG. 8F). For example, the football's Y-position becomes the redefined line's midpoint, and N points are added per yard over the configured extent the region of interest 150. In step 624, the points of each redefined line 160 is refined to place the point in the center of the field line 30 in the region of interest 150. The suitability of a redefined line 160 for continued processing is selectively customizable by setting related parameters. For example, in step 626, outlier points are removed from each redefined line 160. Outliers are determined by selecting a distance from a best-fit redefined line 160, and/or selecting an angular difference of a segment from the redefined line's typical angle. In a further example of setting related customizing parameters, in step 628, a single redefined line 160 with an overall angle greater than 1° different than the median overall angle of all of the redefined lines 160 is discarded. In step 630, and with reference to the yardage offset 612A calculated in step 612, yardage indicators 162 relative to the football field 10 are assigned to each redefined line 160, determined by the X-position of the redefined line 160. In yet another example of setting related customizing parameters, in step 632, redefined lines 160 with a yardage indicator 162 not divisible by five (5) or off the field are discarded (FIG. 8G). In step 634, the resultant redefined lines 160 are converted to field lines 25 having an absolute position on the football field 10. As the relative position of the object of interest (e.g., the football 50) within the region of interest 150 is known, determining the distance (e.g., in pixels) from the football 50 to the absolute position of the field lines 25 in the region of interest yields an absolute position of the object of interest (e.g., the football 50) on the field 10. In view thereof, the absolute position of the football 50 on the field 10 within about a pixel (e.g., less than 1 inch) is determined.

In another embodiment of process 600 (FIGS. 7A and 7B), the steps 604 to 634 are performed by an algorithm. In step 604, perspective correction based on homography is applied to each of the simple lines 156 (FIG. 8D) to transform the simple lines 156 to appear straight as if the football field 10 is being viewed from directly overhead. Again, the refined or corrected version of each of the simple lines 156 are referred to hereinafter as corrected lines. In step 606, corrected lines that aren't close to being vertical are discarded. For example, corrected lines that do not exhibit a typical angle equal to 90.0°±2.5° are discarded. In step 608, corrected lines shorter than a minimum length are discarded. For example, such a minimum length is selectively set to a percentage of the width of the football field 10. In step 610, corrected lines that are not near or proximate to a yard line 20 are discarded. In step 612, the median distance of the corrected lines from the closest yard line 20 is calculated. In one embodiment, the corrected lines are grouped according to the calculated mean distance from the closest yard line 20, the groups are scored based on the number of lines within the group and average length of the lines in the group, and only the corrected lines within the highest scoring group are retained while the remaining corrected lines are discarded. In step 612, a yardage offset 612A is calculated as a median distance from a known yard line 20.

Continuing with the algorithm implementing the process 600, in step 614, hash marks 30A to 30D depicted in the region of interest 150 are detected. A set of corrected lines is filtered to identify potential hash marks based on length, angle, and approximate location of the corrected line relative to an expected position of a hash mark. One hash mark fit line is calculated through the upper or top of the line coordinates and any outliers are removed; and another hash mark fit line is calculated through the lower or bottom of the line coordinates and any outliers are removed. The hash mark fit lines are grouped by their distance from expected hash marks 30A to 30D. The hash mark fit lines in the largest group are retained and the remaining hash mark fit lines are discarded. Yardage indicators relative to the football field 10 are assigned to each of the retained hash mark fit lines. In step 616, lines that are outside of play or off of the football field 10 are discarded. In step 618 (FIG. 7B), similar lines are joined together into the joined lines 158 (FIG. 8E), and the joined lines 158 are grouped by their approximate yardage. For each joined line group, a replacement joined line 158 is created between the point with the maximum Y-value to the point with the minimum Y-value. In step 620, joined lines 158 shorter than a post-join minimum length (e.g., a percentage of total field width) are discarded.

Continuing with the algorithm implementing the process 600, in step 622, the shape of the redefined lines 160 is refined by adding inner points to each redefined line 160, centered around the detected relative position of the football 50 (FIG. 8F). The extent of each redefined line 160 is specified in yards and determines how far the redefined line 160 extends away from the detected relative position of the football 50. In steps 624 to 628, the inner points added to each redefined line 160 are further refined using a center-of-gravity morphology and distance transform method. The method iterates through each inner point and crops a small area of the image around the point. The cropped image is up-scaled and thresholding is applied. The center of the redefined line 160 width is precisely located and the point is relocated to that position. For each inner point, a region of interest of the cropped image is calculated, and the image is resized according to a selected scale. The cropped image is resized according to a specified scale and using a pixel interpolation method such as, for example, cubic interpolation. A customizable thresholding method is selected and a set of customizable parameters are established for applying the thresholding method to the image. Such customizable thresholding methods include, for example, adaptive thresholding, HSV (Hue, Saturation, and Value) thresholding, and the like. Holes in the threshold image are filled using a morphological transform "close" technique (dilation followed by erosion).

The inner points of the redefined line 160 are further refined using a center-of-gravity morphology and distance transform method. Indicators, referred to herein as "blobs," in the threshold image are identified and located in the threshold image. The largest blob that isn't clipped on the left or right, and is at least half the height of the threshold image, is identified and located in the threshold image. The respective inner point is relocated to the center of gravity of the largest valid blob in the threshold image, and the distance transform of the threshold image is calculated. The method is iteratively performed through each row and the column containing the maximum value for that row is identified. A list is generated of the column index and maximum value for each row, and the list includes first and last non-zero row indices. The respective inner point is relocated to the median column from the list and the median non-zero row index. In one embodiment, all redefined lines 160 with fewer than two (2) inner points are removed. Outliers too far from a best-fit line are removed, and the best-fit line is drawn through all the remaining inner points. Outlier points from each redefined line 160 are removed based on a selected distance factor and a max angle factor as described above with reference to steps 606 and 608. For example, a Y-distance of each inner point from the best-fit line is calculated. An Nth percentile of distance is established and all points with a Y-distance exceeding the Nth percentile distance are removed. If the point count is less than or equal to two (<=2), points are no longer removed. Outliers of segments of the redefined line 160 having an angle too different from the typical angle of the redefined line 160 are removed wherein the typical angle of the line is, for example, a median angle of each line segment of the redefined line 160. In another example, a valid angle is determined by an absolute segment angle and all outliers are removed. A search forward through the line segments is performed until a valid angle is found. The searching forward continues and removes end points of segments with invalid angles. A search backward from the segment with the first valid angle is performed and removes starting points of segments with invalid angles. Again, if the point count is less than or equal to two (<=2), points are no longer removed. All redefined lines 160 having an overall angle greater than 1° different than the median overall angle of all of the redefined lines 160 are discarded. The overall angle of the respective redefined line 160 is selectively set to the angle from the start point to the end point of the respective redefined line 160, ignoring all the inner points.

Continuing with the algorithm implementing the process 600, in step 630, and with reference to the yardage offset 612A calculated in step 612, yardage indicators 162 relative to the football field 10 are assigned to each redefined line 160, determined by the X-position of the redefined line 160 (FIG. 8G). In one embodiment, the yardage indicators 162 are snapped to the nearest yard line 20. In step 632, redefined lines 160 with a yardage indicator 162 not divisible by five (5) or off the field are discarded.

Figure 9:
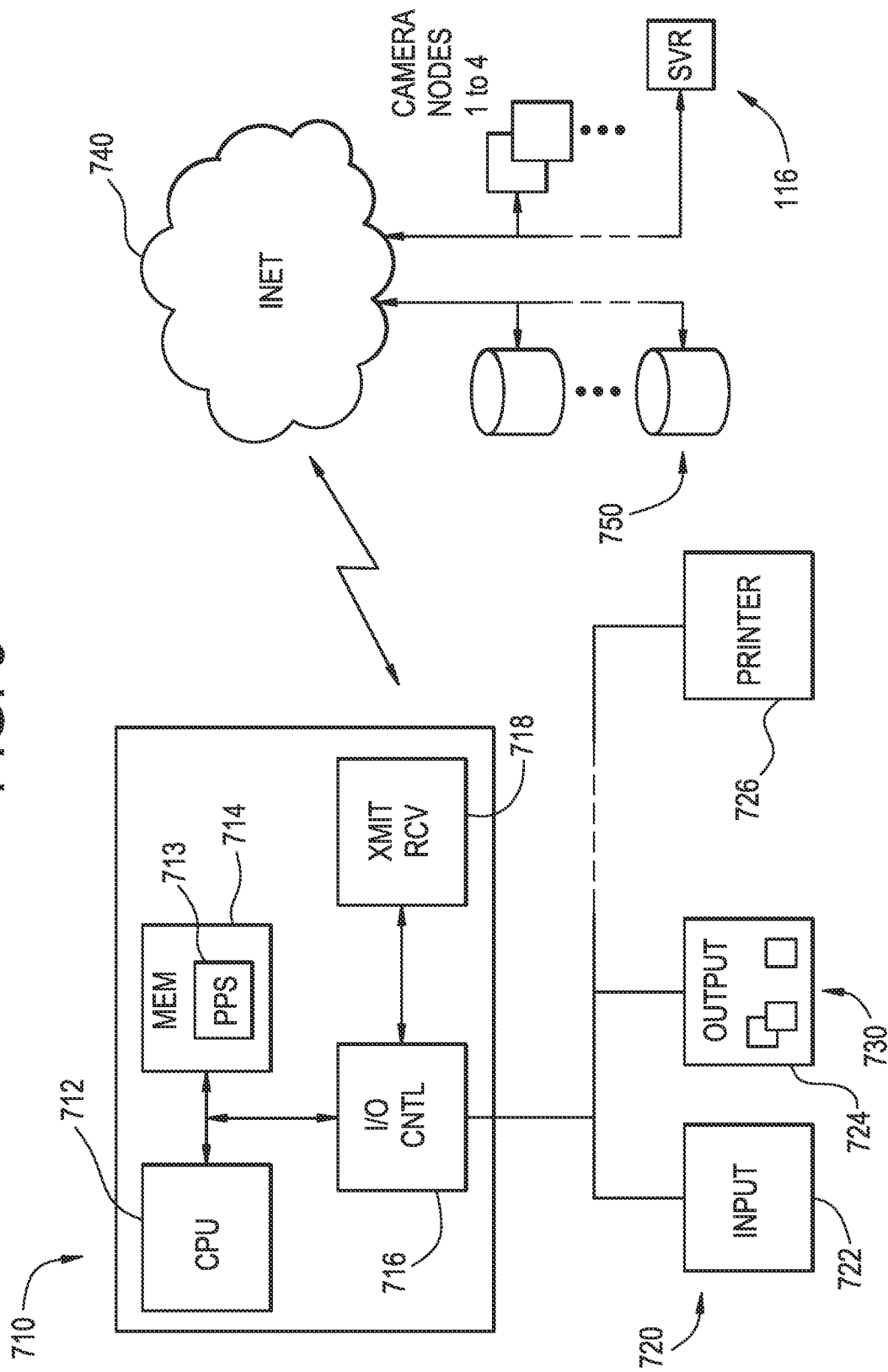
FIG. 9 is a simplified schematic block diagram of a computer system embodying the algorithm for determining the absolute position of an object on a field of play in accordance with one embodiment of the present invention.

It should be appreciated that, as illustrated in FIG. 9, an embodiment of the method and system of the present invention may take the form of a hardware embodiment (e.g., a processor or CPU 712 of a computer system 710) that uses software (including firmware, resident software, microcode, etc.). For example, an embodiment may take the form of a computer program product 713 on a tangible computer-usable storage medium 714 of the computer system 710, having computer-usable program code (e.g., a program product PPS 713) embodied in the medium. As illustrated in FIG. 9, the memory device or memory portion 714 of the hardware employed can form the medium. Computer program code or firmware to carry out an embodiment of the present disclosure could also reside on optical or magnetic storage media, especially while being transported or stored prior to or incident to the loading of the computer program code or firmware into the hardware. This computer program code or firmware can be loaded, as an example, by connecting the computer system 710 to the programming interface.

In one embodiment, the memory 714 also includes each previously determined absolute position of the object of interest (e.g., the football 50), as well as image data including the images 110A and metadata for images (e.g., date and timestamp data). The previously determined absolute positions may be utilized to indicate an error when an official places or spots the football 50 on the football field 10 after a play is completed. For example, the system 100 generates an absolute position of the football 50 on the football field 10 as positioned by the official after completion of the last play, and then makes a comparison to a previous indication of the absolute position of the football 50 on the football field 10 as generated after the completion of a previous play. If, for example, the last play resulted in no advancement or loss of yardage (e.g., an incomplete pass), then the football 50 should be placed at the same position on the field 10 following the last play as it was placed in the previous play, i.e., prior to start of the last play. By evaluating a current placement of the football 50 and comparing it to a previous placement of the football the system 100 calculates an error indication, if present, e.g., a distance from the absolute position of the football 50 as placed on the football field 10 by the official as generated after the completion of the last play to the absolute position of the football 50 on the football field 10 as generated after the completion of the previous play. Thereafter, the system 100 can communicate an error indication signal to the official which includes the calculated error indication as a distance from the absolute position of the football 50 as placed on the football field 10 by the official in the previous play and the absolute position of the football 50 on the football field 10 as generated after the completion of the last play.

As can be appreciated, the above-described embodiments of a method and system for determining the absolute position of the football 50 on the football field 10 provide a number of innovations for the play and media coverage of football games, and other sporting events. In one embodiment, the system 100 provides the absolute position of the football 50 after making an adjustment or calculation to account for a penalty assessed during the game. In one embodiment, the yardage to be assessed, and thus the distance by which the football 50 is repositioned, is entered into the system 100 by an on-field or off-field official using a remote-control device, or by a user or operator in a control room. The system 100 provides for precise placement or absolute positioning of the football 50 following a penalty.

In one embodiment where the system 100 tracks and records all of the previously-determined absolute positions of the football 50, if an official's call or decision is challenged and, upon review, the challenge results in the decision being overturned, the correct position of the football 50 is instantaneously recalled without a need for review of previous game footage. In addition, by storing a timestamp with each image 110A, the system 100 provides for the synchronization of the images 110A acquired by camera nodes 1 to 4 with broadcast footage which assists with play reviews, or may be used to enhance a broadcast viewer's enjoyment in watching play of the game.

In one embodiment, the system 100 includes an advanced user interface that allows an operator to determine the precise position of any object on the playing field. For example, images 110A previously captured or acquired by the camera nodes 1 to 4 can be reviewed, a different object of interest can be selected such as, for example, a player's foot or a portion of a sideline 14A or 14B (where a player went out-of-bounds) or end zone 12A and 12B (where the ball and/or player reached the plane indicating a score), to determine the absolute position at which the football 50 should be placed or spotted on the football field 10.

It should be appreciated and understood that the present invention may be embodied as systems, methods, apparatus, computer readable media, non-transitory computer readable media and/or computer program products. The present invention may take the form of an entirely hardware embodiment, an entirely software embodiment (including firmware, resident software, micro-code, etc.) or an embodiment combining software and hardware aspects that may all generally be referred to herein as a "circuit," "module," "system," or "processor" configured to practice the method(s) or system(s) of the invention. The present invention may take the form of a computer program product embodied in one or more computer readable medium(s) having computer readable program code embodied thereon.

One or more computer readable medium(s) may be utilized, alone or in combination. The computer readable medium may be a computer readable storage medium or a computer readable signal medium. A suitable computer readable storage medium may be, for example, but not limited to, an electronic, magnetic, optical, electromagnetic, infrared, or semiconductor system, apparatus, or device, or any suitable combination of the foregoing. Other examples of suitable computer readable storage medium (e.g., MEM 714) would include, without limitation, the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. A suitable computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. For example, and as illustrated in FIG. 9, the computer system 710 may also include an input-output controller 716 operatively coupled to input and output devices, shown generally at 720, including an input device 722 for facilitating input of data and information to the computer system 710 such as a keyboard, a mouse, light pen pointing device, document scanner, or other input device, and output devices for displaying inputted and/or processed data and other information 730 such as a pixel-oriented display device 724, printer 726 or the like. In one embodiment, the computer system 710 includes a transceiver 718 operatively coupled to a communications network 740 such as the Internet, an intranet, an extranet, or like distributed communication platform for accessing one or more storage devices 750 and/or sending and receiving data, information, commands, and otherwise communicating with one or more of the server 116 and/or camera nodes 1 to 4 over wired and wireless communication connections.

In one embodiment of the present invention, a method and system for determining the absolute position of an object on a field of play, using image analysis techniques, includes assisting an official or referee in placing the object on the field of play in the determined absolute position. For example, the system 100 for determining the absolute position of the football 50 on the football field 10 assists the official in repositioning the football 50 on the football field 10 before, between and after plays, with increased accuracy. The position of the football during play dictates an offensive team's progress in advancing toward their opponent's end zone to score points, and when the offensive team advances the football at least ten (10) yards from an initial line of scrimmage within a series of four (4) plays or downs, a new first of the series of four downs is attained that allows the offensive team to retain possession of the football and control of a next offensive play.

In one embodiment, the system 100 generates the absolute position of the football 50 on the football field 10 and designates a specified distance from a known location on the football field 10. In addition, the absolute positioning of the football 50 on the football field 10 enables the calculation of the yardage the offensive team advanced the football within the series of four (4) plays or downs to attain a new first down. In one embodiment, the system 100 transmits the absolute position of the football 50 on the football field 10 to a portable or remote computing device.

Figure 10A:
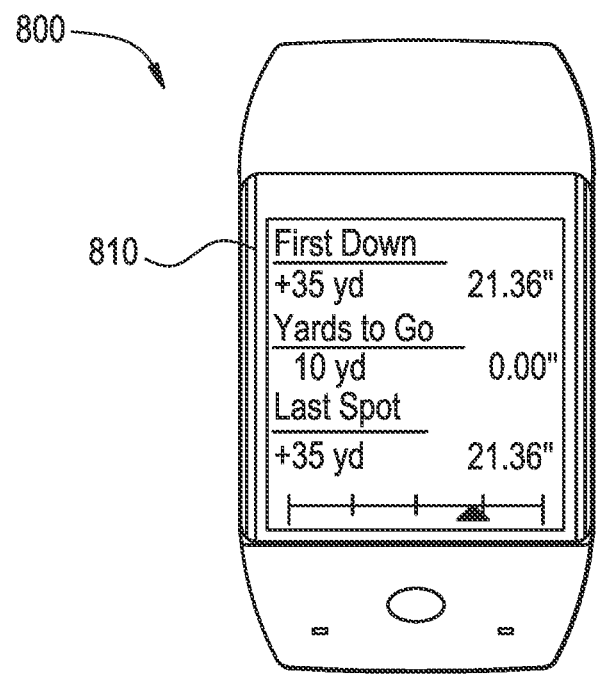
FIG. 10A is a depiction of one embodiment of a wearable display for use in cooperation with the system of FIG. 1, with one resultant image appearing on a display screen of the wearable display.
Figure 10B:
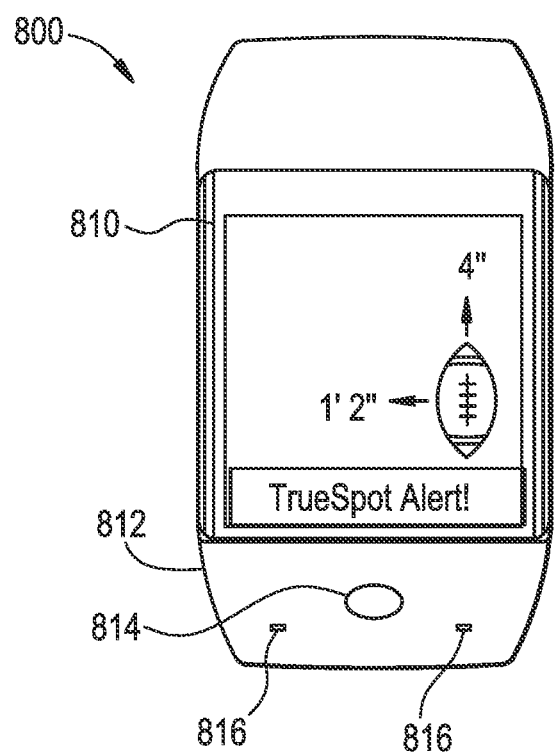
FIG. 10B is a depiction the wearable display of FIG. 10A, with another resultant image appearing on the display screen of the wearable display.

In one embodiment and as shown in FIGS. 10A and 10B, a wearable display 800 is provided to one or more of the officials and includes a display screen 810 and a wristband 812 attached to the display screen 810 and configured to be worn around a wrist of the official. The display 800 includes a wireless adapter (not shown) that transmits data (e.g., images 110A, and related information such as, for example, arrays of pixels digitizing the images 110A, metadata including data and time stamps for when the images 110A were captured, and the like) to, and receives data from, the server 116 via, for example the Wi-Fi access points 118 and the switching device 120. In one embodiment, the information provided to the official may be presented in, for example, augmented reality as computer-generated perceptual information (e.g., visual information) projected to the field in proximity to the official and demonstrating the absolute location of the football on the field.

For example, the absolute position of the football 50 on the football field 10 is designated as a number of inches from a nearest yard line 20. In one embodiment, the absolute position of the football 50 on the football field 10 is specified as, for example, 21.36 inches from the 35-yard line. As shown in FIG. 10A, corresponding data is transmitted via the Wi-Fi access points 118 and the switching device 120 from the server 116 to the wearable display 800 and the data is displayed on the display screen 810. As further shown in FIG. 10A, the distance to attain a new first down is ten (10) yards.

The official places or spots the football 50 on the football field 10 after a play is completed. Concurrently, the system 100 will generate an absolute position of the football 50 on the football field 10 as positioned by the official after completion of the last play, and make a comparison to a previous indication of the absolute position of the football 50 on the football field 10 as generated after the completion of a previous play. If, for example, the last play resulted in no advancement or loss of yardage (e.g., an incomplete pass), then the football 50 should be placed at the same position on the field 10 following the last play as it was placed in the previous play, i.e., prior to start of the last play. By evaluating a current placement of the football and comparing it to a previous placement of the football the system 100 calculates an error indication, if present, e.g., a distance from the absolute position of the football 50 as placed on the football field 10 by the official as generated after the completion of the last play to the absolute position of the football 50 on the football field 10 as generated after the completion of the previous play. Thereafter, and as shown in FIG. 10B, the system 100 provides an error indication signal 170 which includes the calculated error indication as a distance from the absolute position of the football 50 as placed on the football field 10 by the official in the previous play and the absolute position of the football 50 on the football field 10 as generated after the completion of the last play.

As shown in FIG. 10B, the spot or position of the football 50 on the football field 10 should be corrected to the absolute position of the football 50 on the football field 10 as generated after the completion of the last play by moving the football 50 one foot and two inches (1'2") to the left and four inches (4") forward. Thus, the official is assisted by the system 100 in placing the football 50 on the football field 10 at the absolute position of the football 50 on the football field 10 as generated after the completion of the last play. In one embodiment, the wearable display 800 includes a button or trigger device 814 to activate the acquisition of images 110A by the camera nodes 1 to 4. In addition, when activated by the official, the location of the trigger device 814 may be used by the system in locating the general area in which to search for the football 50 as, for example, in step 302A of process 300 in which the official transmits a signal to the server 116 thereby providing an approximate coordinate of the position of the football 50 on the playing field 10. In one embodiment, the wearable display 800 includes a microphone/speaker set 816 with which the official may communicate with a system operator or user to assist the official in placing the football 50 on the football field 10 by communicating the absolute position of the football 50 on the football field 10 as generated after the completion of the last play.

In one embodiment and as shown in FIGS. 11A to 11D, a mobile communication device 900 is provided to the official and includes a display screen 910 and a band 912 (or a set of bands 912) attached to the mobile communication device 900 and configured to be worn around an arm of the official. The mobile communication device 900 includes a wireless adapter (not shown) that transmits data (e.g., images 110A, and related information such as, for example, metadata including data and time stamps for when the images 110A were captured, and the like) to, and receives data from, the server 116 via, for example the Wi-Fi access points 118 and the switching device 120.

Figure 11A:
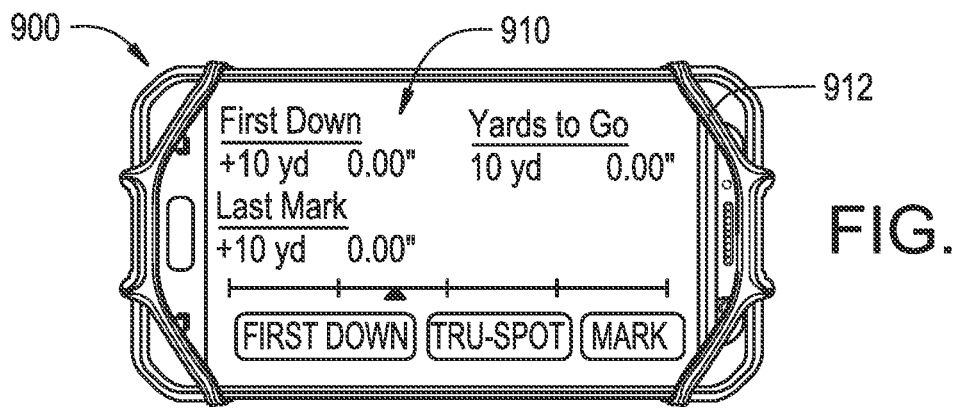
FIG. 11A is a depiction of another embodiment of a wearable display for use in cooperation with the system of FIG. 1, with one resultant image appearing on a display screen of the wearable display.
Figure 11B:
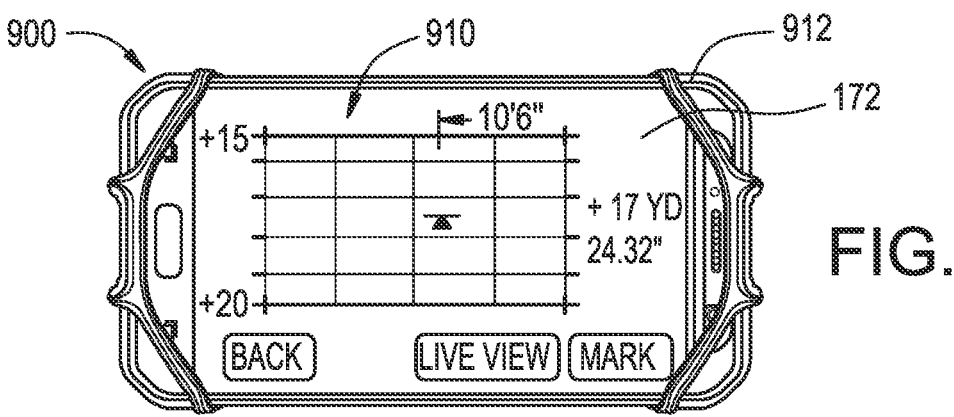
FIG. 11B is a depiction the wearable display of FIG. 11A, with another resultant image appearing on the display screen of the wearable display.
Figure 11C:
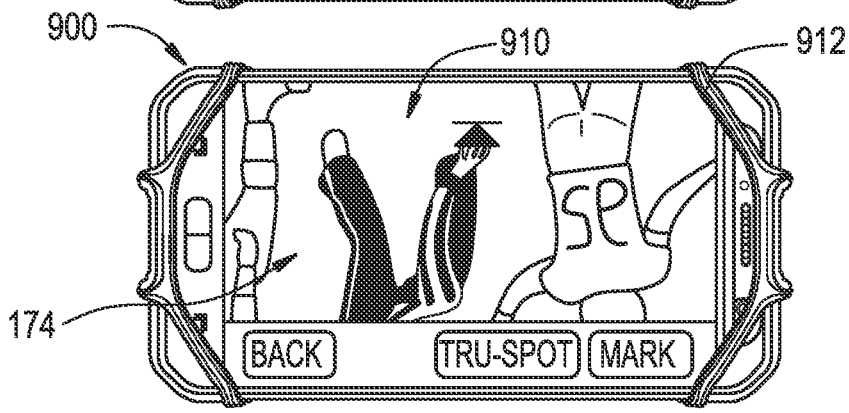
FIG. 11C is a depiction the wearable display of FIG. 11A, with yet another resultant image appearing on the display screen of the wearable display.

As shown in FIG. 11A, for example, display screen 910 displays data received by the mobile communication device 900 from the server 116 indicating that the absolute position of the football 50 on the football field 10 is directly on the 10-yard line and the distance to attain a new first down is 10 yards. In one embodiment, and as shown in FIG. 11B, an overlay image 172 or grid view of the football field 10 is transmitted to the mobile communication device 900 from the server 116 and includes an indication of the absolute position of the football 50 on the football field 10 specified as 24.32 inches from the 17-yard hash mark. In one embodiment, and as shown in FIG. 11C, the camera receives an augmented reality image 174 of the football field 10 with an overlay of the position where the football 50 should be positioned or spotted. In one embodiment, the augmented reality image 174 is a static image. In one embodiment, the augmented reality image 174 is a live image or live video feed in which the official can see himself/herself placing the football 50 on top of the virtual image of the football field 10.

Figure 11D:
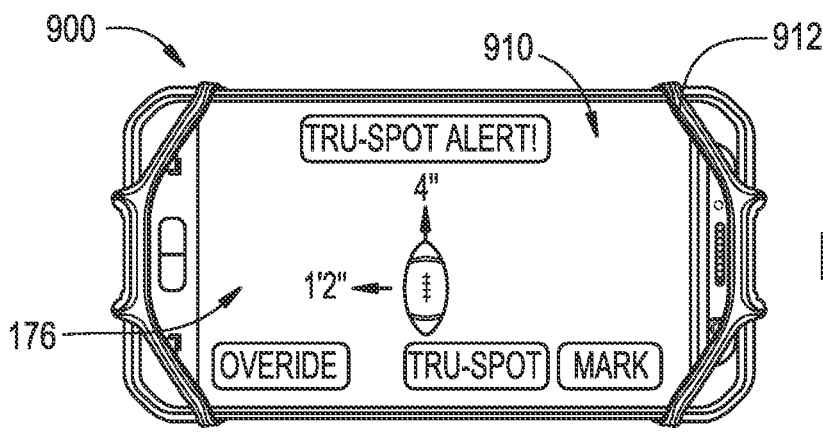
FIG. 11D is a depiction the wearable display of FIG. 11A, with yet another resultant image appearing on the display screen of the wearable display.

As shown in FIG. 11D, the spot or position of the football 50 on the football field 10 should be corrected to the absolute position of the football 50 on the football field 10 as generated after the completion of the last play by moving the football 50 one foot and two inches (1'2") to the left and four inches (4") forward. Thus, the official is assisted by the system 100 in placing the football 50 on the football field 10 the absolute position of the football 50 on the football field 10 as generated after the completion of the last play.

It should be appreciated that the wearable display 800 and the mobile communication device 900 are portable computing devices that may take the form of a hardware embodiment that uses software as shown in FIG. 9 and described with reference to computer system 710. While the system 100 has been shown and described as including the wearable display 800 and/or the mobile communication device 900, the present invention is not limited in this regard as other portable or remote computing devices such as, for example, a tablet or a virtual or augmented reality display such as so-called "smart" glasses (e.g., Google Glass), can be employed without departing from the broader aspects of the present invention.

Computer program code for carrying out operations for aspects of the present invention may be written in any combination of one or more programming languages, including an object oriented programming language such as Java, Scala, Ruby, Python, Smalltalk, C++ or the like and conventional procedural programming languages, such as the "C" programming language or similar programming languages. The program code may execute entirely on the user's computing device (such as, the computer system 710), partly on the user's computing device, as a stand-alone software package, partly on the user's computer device and party on a remote computing device or entirely on the remote computing device or server. In the latter scenario, the remote computing device may be connected to the user's computing device through any type of network, including a local area network (LAN), a wide area network (WAN), or a wireless local area network (WLAN), or the connection may be made to an external computing device (for example, through the Internet using an Internet Service Provider).

The methods of operation of the present invention may be implemented by computer program instructions. These computer program instructions may be provided to a processor of a general purpose computing device (such as, the computer system 710), special purpose computing device, or other programmable data processor or processing apparatus to produce a machine, such that the instructions, which execute via the processor of the computing device or other programmable data processing apparatus, create means for implementing the functions/acts specified in the flowchart and/or block diagram block or blocks.

These computer program instructions may also be stored in a computer readable medium that can direct a computing device, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computing device, other programmable apparatus or other devices to produce a computer implemented process such that the instructions which execute on the computing device or other programmable apparatus provide processes for implementing the functions/acts specified in a flowchart and/or block diagram block or blocks.

Thus, the present invention provides one or more of the following advantages: 1) to permit a means of object location that is flexible in terms of installation requirements, with a high degree of accuracy, and requiring minimal user interaction during normal operation;c and 2) once an installed camera is calibrated and trained to detect a specific object of interest, the system requires minimal input from the end user, and may be configured for fully autonomous operation.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above-detailed description, but that the invention will include all embodiments falling within the scope of the appended claims.

What is claimed is:

1. A system for determining an absolute position of an object of interest in an area of interest, comprising:
 a server having a processor and memory;
 a plurality of cameras operably coupled to the server, each of the plurality of cameras disposed about an area of interest and acquiring one or more images of an object of interest and the area of interest within a field of view of the camera;
 the processor of the server configured to determine an absolute position of the object of interest in the area of interest by:
  receiving the one or more images acquired by at least one of the plurality of cameras;
  identifying an approximate location of the object of interest in the area of interest in at least one image of the plurality of images based on a report signal received from an object detector;
  detecting the object of interest within the approximate location of the object of interest by image analysis techniques;
  determining a relative position of the detected object of interest in a first region of interest proximate to the detected object of interest, the relative position of the detected object of interest defined by pixel coordinates;
  detecting stationary markers within a second region of interest proximate to the detected object of interest, the detected stationary markers proximate to the relative position of the object of interest and defined in pixel coordinates;
  generating a field map of the area of interest including the second region of interest and the detected stationary markers;
  determining the relative position of the object of interest in pixel coordinates in relation to at least one detected stationary marker of the field map;
  converting the relative position of the object of interest from the pixel coordinates to x-y coordinates to yield an absolute position of the object of interest in the area of interest; and
  providing the absolute position of the object of interest in the area of interest.

2. The system for determining an absolute position of an object of interest of claim 1, wherein the processor is further configured to perform perspective correction of the field map.

3. The system for determining an absolute position of an object of interest of claim 2, wherein the perspective correction of the field map performs at least one of a plurality of techniques to compensate for the at least one of the plurality of cameras' position/perspective and movement including rotation and translation, crown correction techniques to compensate for topography of the area of interest, and lens correction techniques to compensate for distortion caused by a lens of the at least one of the plurality of cameras.

4. The system for determining an absolute position of an object of interest of claim 1, wherein the field map is based on a homography defining a correspondence between one or more pairs of points, each pair of points including a point in the field of view of at least one of the plurality of cameras and a point on at least one of the stationary markers in the area of interest.

5. The system for determining an absolute position of an object of interest of claim 1, wherein the identifying the approximate location of the object of interest includes receiving the report signal from the object detector including an approximate location from at least one of an official in the area of interest, an operator, and a neural network trained to locate an approximate position of the object of interest.

6. The system for determining an absolute position of an object of interest claim 1, wherein the report signal is transmitted by an official in the area of interest when the official is proximate to the object of interest and activates the object detector.

7. The system for determining an absolute position of an object of interest of claim 1, wherein the identifying the approximate location of the object of interest includes receiving the report signal including an approximate location from a radio frequency identification (RFID) tag on or in the object of interest.

8. The system for determining an absolute position of an object of interest of claim 1, further comprising a communication device having a display screen, the display screen visually presenting to a user of the communication device the provided absolute position of the object of interest in the area of interest.

9. The system for determining an absolute position of an object of interest of claim 8, wherein the display screen further presents an error indication indicative of an error in a current placement of the object of interest in the area of interest.

10. The system for determining an absolute position of an object of interest of claim 9, wherein the processor is further configured to:
determine the error indication indicative of a difference in distance between the absolute position of the object of interest in the area of interest and a current placement of the object of interest in the area of interest.

11. The system for determining an absolute position of an object of interest of claim 9, wherein the processor is further configured to:
determine the error indication indicative of a difference in distance between the absolute position of the object of interest in the area of interest and a previously determined absolute position of the object of interest in the area of interest.

12. The system for determining an absolute position of an object of interest of claim 9, wherein the processor is further configured to:
determine the error indication indicative of a difference in distance between the absolute position of the object of interest in the area of interest and an offset from a previously determined absolute position of the object of interest in the area of interest.

13. The system for determining an absolute position of an object of interest of claim 9, wherein a distance of the error indication includes at least one of an x-coordinate and a y-coordinate in a unit of measurement of the area of interest.

14. The system for determining an absolute position of an object of interest of claim 8, wherein the communication device is wearable by the user.

15. The system for determining an absolute position of an object of interest of claim 14, wherein the display screen of the communication device visually presents the absolute position of the object of interest in x-y coordinates in a unit of measurement of the area of interest.

16. The system for determining an absolute position of an object of interest of claim 14, wherein the display screen of the communication device visually presents the absolute position of the object of interest in a unit of measurement of the area of interest, an overview image providing a grid view of the area of interest, and an indication of the absolute position on the overview image.

17. The system for determining an absolute position of an object of interest of claim 14, wherein the display screen of the mobile communication device visually presents the absolute position of the object of interest in a unit of measurement of the area of interest, an overview image providing a grid view of the area of interest, and an augmented reality image of the absolute position on the overview image.

18. The system for determining an absolute position of an object of interest of claim 1, wherein an official operates a wireless device to transmit the report signal.

19. The system for determining an absolute position of an object of interest of claim 1, wherein an operator operates a user interface to transmit the report signal.

20. A method for determining an absolute position of an object of interest in an area of interest, the method comprising:
receiving one or more images acquired by at least one of a plurality of cameras disposed about an area of interest, each of the plurality of cameras acquiring one or more images of an object of interest and the area of interest within a field of view of the camera;
identifying an approximate location of the object of interest in the area of interest in at least one image of the one or more received images based on a report signal received from an object detector;
detecting within the at least one image the object of interest within the approximate location of the object of interest by image analysis techniques;
determining a relative position of the detected object of interest in a first region of interest proximate to the detected object of interest, the relative position of the detected object of interest defined by pixel coordinates;
detecting stationary markers within a second region of interest proximate to the detected object of interest, the detected stationary markers proximate to the relative position of the object of interest and defined in pixel coordinates;
generating a field map of the area of interest including the second region of interest and the detected stationary markers;
determining the relative position of the object of interest in pixel coordinates in relation to at least one detected stationary marker of the field map;
converting the relative position of the object of interest from the pixel coordinates to x-y coordinates to yield an absolute position of the object of interest in the area of interest; and
providing the absolute position of the object of interest in the area of interest.

\* \* \* \* \*